US007206604B2

(12) United States Patent
Berra et al.

(10) Patent No.: US 7,206,604 B2
(45) Date of Patent: Apr. 17, 2007

(54) CONTROLLER FOR GSM AND 3G BASE TRANSCEIVER STATIONS IN A GSM CORE NETWORK WITH EXTERNAL HANDOVER POSSIBILITY FROM 3G CELLS TO GSM CELLS TRANSPARENT TO GSM CORE NETWORK

(75) Inventors: Marco Berra, Mesero (IT); Stefano Sartorelli, Busto Garolfo (IT)

(73) Assignee: Siemens Mobile Communications S.p.A., Milan (IT)

( * ) Notice: Subject to any disclaimer, the term of this patent is extended or adjusted under 35 U.S.C. 154(b) by 165 days.

(21) Appl. No.: 10/515,480

(22) PCT Filed: May 16, 2003

(86) PCT No.: PCT/EP03/05189

§ 371 (c)(1),
(2), (4) Date: Nov. 24, 2004

(87) PCT Pub. No.: WO2004/016024

PCT Pub. Date: Feb. 19, 2004

(65) Prior Publication Data
US 2005/0153743 A1    Jul. 14, 2005

(30) Foreign Application Priority Data
Aug. 1, 2002    (IT)    ............................ MI2002A1724

(51) Int. Cl.
H04B 1/38 (2006.01)
(52) U.S. Cl. ........................................ 455/560; 455/436
(58) Field of Classification Search .............. 455/560, 455/436
See application file for complete search history.

(56) References Cited

U.S. PATENT DOCUMENTS 5,432,843 A * 7/1995 Bonta ...................... 455/438

(Continued)

FOREIGN PATENT DOCUMENTS

EP    1 102 511 A    5/2001

(Continued)

*Primary Examiner*—Edan Orgad
*Assistant Examiner*—Fayyaz Alam
(74) *Attorney, Agent, or Firm*—Birch, Stewart, Kolasch & Birch, LLP

(57) ABSTRACT

A station controller (M-BSC) is connected to base transceiver stations BTS of the GSM (Global System for Mobile), or DCS (Digital Cellular System) mobile transceiver system, and to BTSC base transceiver stations of the TD-SCDMA (Time Division Synchronous Code Division Multiple Access) system through code division transceiver access technology, typical of 3G systems, and TDD duplexing. The controller is connected to a MSC circuit switch of GSM type. The new 3G technology shares the GSM core network, which on the contrary ignores the existence of the latter. Transparency of the 3G new technology towards the core network is achieved inhibiting any handover from GSM cells to BTSC cells and enabling the external handover (through MSC intervention) from BTSC cells to GSM cells after appropriate treatment of information to be sent to MSC. The ad hoc procedure is carried out by the station controller and consists in reprocessing the mixed list (2G and 3G) of cells candidate for handover furnished with by BTSC, to obtain two lists of cells differing as to radio technology, selecting a list to be forwarded to MSC according to service qualification criteria, comparing in a local memory the (MS/UE) mobile classmarks owned by MSC with those associated to the selected list and, in case of inconsistency, updating MSC classmarks prior to the forwarding of the selected list.

10 Claims, 16 Drawing Sheets

U.S. PATENT DOCUMENTS

| | | | |
|---|---|---|---|
| 6,201,969 B1* | 3/2001 | Meier | 455/442 |
| 6,771,964 B1* | 8/2004 | Einola et al. | 455/437 |
| 6,795,708 B1* | 9/2004 | Patel | 455/450 |
| 6,983,149 B2* | 1/2006 | Lindquist et al. | 455/436 |
| 7,013,133 B2* | 3/2006 | Hayduk | 455/419 |
| 7,013,141 B2* | 3/2006 | Lindquist et al. | 455/435.1 |
| 7,031,703 B1* | 4/2006 | Graf et al. | 455/432.1 |
| 2002/0105927 A1* | 8/2002 | Holma et al. | 370/331 |
| 2002/0193139 A1* | 12/2002 | Mildh et al. | 455/552 |
| 2003/0002525 A1* | 1/2003 | Grilli et al. | 370/465 |
| 2003/0114158 A1* | 6/2003 | Soderbacka et al. | 455/436 |
| 2004/0053630 A1* | 3/2004 | Ramos et al. | 455/500 |
| 2004/0120286 A1* | 6/2004 | Schwarz | 370/331 |
| 2004/0121770 A1* | 6/2004 | Tigerstedt et al. | 455/436 |
| 2004/0252656 A1* | 12/2004 | Shiu et al. | 370/328 |
| 2005/0037758 A1* | 2/2005 | Rimoni | 455/436 |
| 2005/0075074 A1* | 4/2005 | Benson et al. | 455/67.11 |
| 2005/0277415 A1* | 12/2005 | Hamalainen et al. | 455/436 |
| 2006/0077957 A1* | 4/2006 | Reddy et al. | 370/352 |
| 2006/0126515 A1* | 6/2006 | Ward et al. | 370/241 |

FOREIGN PATENT DOCUMENTS

EP    1 209 941 A    5/2002

* cited by examiner

PPLD: MESSAGE RECEPTION, ANALYSIS AND DISTRIBUTION

MSC: MESSAGE RECEPTION, ANALYSIS AND DISTRIBUTION

IMMEDIATE ACQUISITION OF CLASSMARKS OF BOTH THE SYSTEMS

CONTROLLER FOR GSM AND 3G BASE TRANSCEIVER STATIONS IN A GSM CORE NETWORK WITH EXTERNAL HANDOVER POSSIBILITY FROM 3G CELLS TO GSM CELLS TRANSPARENT TO GSM CORE NETWORK

FIELD OF THE INVENTION

The present invention relates to the sector of mobile telecommunication, and more specifically to a controller for GSM and 3G base transceiver stations in a GSM core network with external handover possibility from 3G cells towards GSM cells transparent to GSM network.

BACKGROUND ART

Among the public cellular mobile telecommunication stems, or PLMN (Public Land Mobile Network), one of the most reputable certainly is the pan-European 900 MHz GSM system (Global System for Mobile communications), and its immediate descendant 1800 MHz DCS (Digital Cellular System). GSM is a second generation system, conforming with specifications published in the form of recommendations by specialized supranational organizations (CEPT/CCITT, within ETSI/ITU-T) whose objective is to standardize the operation of telecommunication systems proposed by the different manufacturers, in order to make them compatible and therefore able to communicate.

In the design of mobile transceiver systems, the most determining factor in design development is the choice of the access type, which is intended to be implemented on the physical channel for distribution of the available band among the different users. The access technologies, most used by the second-generation systems, are: the FDMA technology (Frequency Division Multiple Access) that performs the frequency division multiple access, the TDMA technology (Time Division Multiple Access) that performs the time division multiple access, and the SDMA technology (Space Division Multiple Access) that performs the space division multiple access.

In the FDMA technology, each user can avail of his own frequency channel shared by no other user during all the time required by the service; this case, named SCPC (Single Channel Per Carrier) is typical of the first generation analogical systems. In the TDMA technology, a single frequency channel is allocated to several users at different times called timeslots; during a timeslot only one user may transmit and/or receive on the frequency allocated to that timeslot (which can vary from one timeslot to the next one in case of Frequency Hopping). In the SDMA technique a single frequency channel is allocated to several users at the same time; discrimination between the different users is performed through the recognition of the different arrival directions of radio signals. In a same mobile system, the above mentioned access technologies can be used separately, or together in order to take avail of possible synergies. The GSM system uses a mixed FDMA-TDMA technology that, with respect to the pure FDMA, avoids an excessive use of carriers, while with respect to the pure TDMA technology, it avoids the construction of too long frames that cannot be proposed.

In the PLMN systems, the user may send information to the base station while receiving information from the latter. This communication method is called Full-duplex and may be performed using technologies both in the frequency and in the time sectors. The FDD (Frequency Division Duplexing) technology used in GSM employs different bands for the uplink section (uplink) and the downlink one (downlink). Both the bands are separated by an unused gap band to enable the appropriate radio frequency filtering. The TDD (Time Division Duplexing) technology employs different service times for the uplink and downlink sections, in respect with all the channels accessed in both the transmission directions. If the time separation between the two service times is small, transmission and reception seem simultaneous to the user.

FIG. 1 shows a summary but explanatory block diagram of the functional architecture of a mobile system of the GSM or DCS type.

The symbols MS (Mobile Station) indicate mobile telephone sets, also for cars, hereinafter called Mobiles, radio connected to the respective transceivers TRX (not visible in the figure) belonging to relevant base transceiver stations BTS (Base Transceiver Station) spread over the territory. Every transceiver TRX is connected to a group of antennas whose configuration guarantees uniform radio coverage of the cell served by the BTS. A set of N adjacent cells, which engage as a whole all the available carriers of the mobile service, is called cluster, the same carriers can be re-employed in adjacent clusters. Several BTS fixed stations are connected to a common controller of base transceiver station denoted BSC (Base Station Controller) through a physical carrier.

The set of several BTS controlled by a BSC forms a functional system denoted BSS (Base Station System).

Several BSS systems are connected to arm automatic switch for mobile, known as MSC (Mobile Switching Centre), directly or through a TRAU (Transcode and Rate Adaptor Unit) block allowing the sub-multiplexing of 16 or 8 kbit/s channels on 64 kbit/s connection lines, thus optimizing its utilization. The TRAU block performs a transcoding from the 64 kbit/s of voice to the 13 kbit/s of GSM Full Rate (or to the 6,5 kbit/s of GSM Half Rate) enabling their convey in 16 kbit/s or 8 kbit/s flows.

The MSC block is connected in turn to an automatic switch of the PSTN (Public Switched Telephone Network) and/or ISDN (Integrated Services Digital Network) land network.

Near the MSC automatic switch two data bases named HLR (Home Location Register) and VLR (Visitor Location Register) are generally installed, not visible in the figure; the first contains stable data of every Mobile MS, while the second contains the variable ones; both the bases cooperate in enabling the system to trace a user who makes widely moving on the territory, extended to the different European countries.

Furthermore, the station controller BSC is connected to a Personal Computer LMT (Local Maintenance Terminal) that allows for the man/machine dialogue to an Operation and Maintenance Center OMC performing supervision, alarm management, evaluation of traffic measurements, etc., functions named O&M (Operation & Maintenance), and finally to a SGSN [Serving GPRS (General Packet Radio Service) Support Node] block specified in GSM 04.64 for the package switching data service. The SGSN node is connected to two separate GGSN (Gateway GPRS Support Node) nodes, out of which, the first performs the interworking function with the external package switching networks, and is connected to other SGSN nodes through a GPRS dorsal network based on the IP protocol (Internet Protocol), while the second one is connected to the PSTN/ISDN automatic switch. The SGSN node is also directly connected to the PSTN/ISDN block trough an signalling-only interface (hatched line).

The figure shows vertical hatched lines that delimit the interface boundaries between the main functional blocks, more in particular, Um denotes the radio interface between MS and BTS, Abis indicates the one between BTS and BSC, and A indicates the interface between TRAU and MSC or directly between the latter and BSC. The following additional interfaces are directly indicated on the respective connections: Asub indicate the interface between BSC and TRAU, T indicate the RS232 interface between BSC and LMT, O indicates the interface between BSC and OMC, Gb indicates the interface between BSC and SGSN, Gs indicates the interface between SGSN and MSC, Gn indicates the interface between SGSN and GGSN of the dorsal GPRS, and finally Gp indicates the interface between SGSN and PSTN/ISDN. The above mentioned interfaces are described in the following GSM recommendations: 04.01 (Um), 08.51 (A-bis), 08.01 (A), 12.20 and 12.21 (O), 04.60 (Gb). The SGSN node is at the same hierarchical level of a MSC center, it follows the individual locations of mobiles and performs the safety and access control functions. To this purpose, the HLR register is enriched with information on the GPRS user.

Whichever public land mobile network (PLMN) that intends to offer users a service quality standard comparable to that offered by the fixed telephone network, shall necessarily acquire a complex signalling system. In the GSM system, a protocol with several hierarchical levels is used for the management of the telephone signalling present at the different interfaces. The protocol has been mainly obtained from the one used in the TACS analogue mobile systems and in the PSTN telephone systems, adjusting it to the new requirements of Um air interface and to those arising from the users' mobility. The levelled structure enables to subdivide the functions of the signalling protocol into overlapped block groups on the control plane (C-Plane), and to describe it as a succession of independent stages. Each level avails of the communication services made available by the lower level and offers its own to the higher level. Level 1 of the above mentioned protocol is closely connected to the type of the physical carrier used for connection at both the sides of the different interfaces; it describes the functions required to transfer the bit flows on the radio connection to the Um interface and on the land connections to Abis and A interfaces. Level 1 of the land connections is described in the recommendations CCITT G.703 and G.711. Level 2 develops functions controlling the proper flow of messages (transport functions) aimed at the development of a virtual carrier free of errors between the connected points. Level 3, called network level, and the higher levels, develop message processing functions to control the main application processes relevant to the management of connections and to the control of calls with respect to the users' mobility.

In the GSM mobile telephone system, the mobile station MS performs a given activities even in absence of calls. Indeed, the mobile requires, as first step to be able to communicate through the network, to continuously choose a cell with which it can be associated during its movements. The above mentioned activities are included in the "Cell Selection and Reselection" function described in the GSM 03.22 and 05.08 recommendations. The mobile selects the cell with which it can be associated performing a scan of all the BCCH (Broadcast Control Channel) carriers foreseen by the GSM, known in advance by the MS because they already stored in its SIM card (Subscriber Identity Module). For everyone of them it measures the power of the received signal, demodulates the RF signal, synchronizes itself with the multiframe structure of the demodulated signal in order to be able to acquire the "System information" from the BCCH channel, among which the identifier of BSIC (Base Station Identity Code) cell and the identifier of the adjacent cells. The selected cell, called also "serving" cell, is the one that results being more reliable. The above mentioned operations are periodically performed during the state of absence of call (idle state) even when the mobile is already associated with a cell, in order to be able to associate again with a different cell if it receives a BCCH carrier of higher reliability (Cell Reselection) from the latter.

Even in dedicated mode, a procedure exists suitable to find the best resources for continuing the connection in the case of movement of the mobile from a cell to an other one. This procedure, peculiar to the cellular mobile systems, is no doubt the handover whose performance enables the network to give a control to a Mobile in order to force it to go on an other channel, of another cell in case of intra-cell handover or of the same serving cell in the case of intra-cell handover. Handover is a fundamental function for whichever mobile telephone system, since it enables the Mobile to communicate though widely moving on the territory during the communication. It prevents the deterioration of the communication channel transmission quality, which otherwise could unavoidably occur as a result of the gradual distance of the Mobile from the complex of antennas of the own serving cell. The channel jump shall furthermore be quickly performed to avoid that users may perceive a noise on the communication under way. Handover is a function mainly concerning the circuit switching systems, i.e. where connections must be maintained during the total duration of conversation otherwise information will be definitely lost during the whole duration of interruption. The package transmission on the GPRS networks does not require a handover similar to the GSM's one, i.e. with channel change during an active transmission, since packages are by their nature discontinuous and it is therefore possible to address the mobile towards mew resources taking advantages of intervals between transmission of a package and the following. As by what has just been said, it can be noticed that the invention dealt with is mainly referred to circuit switching communications, so that the problems concerning the GPRS service will be later on ignored. For a proper performance of the handover method, the mobile carries out measurements similar to those of the "Cell Selection and Reselection" procedure even during a call, and periodically updates a list of N cells, which are the most, favoured for handover.

With reference to FIG. 2, relevant to the GSM (DCS) system of FIG. 1, the level 3 sequence of messages that exists during the first phase of an external handover, i.e. with involvement of the MSC automatic switch is described. Each message starts from a network element and ends at next network element in the direction indicated by an arrow associated with the message. The network elements involved are the MS, BTS, BSC, and MSC blocks. BTS and BSC network entities are called Serving or Target depending on their reference to the present or future mobile cell. The forwards direction (towards the right side in the figure) characterizes messages in the direction from the present cell to the future cell; the backward direction characterizes the opposite direction. The steps of the time sequence of FIG. 2 are as follows:

The serving BTS station transmits to the serving BSC controller a INTERCELL_HAND_CON_IND message which includes a list of cells, among those monitored by the mobile, placed in a decreasing priority order on the basis of their capability to be selected as target to perform a handover. Depending on the manufacturing company that produces the entire BSS system, the message may be present or not, since it is always and however the BTS, or the BSC controller, (on the basis of the most appropriate choices of system) that fills in the final list on the basis of measurements of capacity of the adjacent cells performed by the mobile and forwarded with the MEASUREMENT_RESULT message. The short-term means made by the mobile are subsequently averaged out on a longer observation period, a quality parameter of the connection is therefore prepared for an n-th generic adjacent cell called "Power budget". The Power Budgets PBGT (n) are compared with the respective thresholds, given as E&M (Operation and Maintenance) parameters, obtaining values called HO_MARGIN (n), that shall be used for Handover decisions. To this purpose, a list that includes a highest number of M preferred cells with which the Mobile could perform a Handover is filled in; from this list it is deduced that the list initially given by the mobile may even not match the final list. The above mentioned criterion is maybe one of the most known criteria adopted for Handover, but it is not the sole, for example there are criteria related to the Mobile-BTS distance or to the communication quality, just to cite only two of them.

The serving BSC while evaluating the list of cells suitable for handover selects, in the presented case of external handover, a cell not configured in the BSS area that is serving the mobile; consequently the handover procedure shall go up again to the hierarchical scale of Network Elements up to MSC. Consequently the BSS forwards the handover request to MSC through a HANDOVER_REQUIRED message including the list of possible target cells. The message in question delegates to MSC the duty of selection of the cell on which the mobile should be transferred.

At this point MSC starts searching for a cell (among those of received list) suitable to satisfy the handover request. Once the target cell has been identified, MSC will send to the targeted BSC a HANDOVER_REQUEST message on the interface A, containing different information among which the "classmarks", i.e. a number of information describing the mobile's capacity, useful for the BSS target to select association for the new resources. These classmarks were previously supplied to MSC by the serving BSS system by means of a CLASSMARK_UPDATE message.

The BSC target sends in turn a CHANNEL_ACTIVATION message to the targeted BTS station to control the enabling of the transmitter.

The BTS target station answers back with a CHANNEL_ACTIVATION_ACK message to notify the enabling of the requested resources.

The BSC target controller sends back to MSC a HANDOVER_REQUEST_ACK message to notify that search and enabling of resources in the target cell have been successfully completed. The message conveys the control to be sent to the mobile to move it on the target cell.

MSC sends back towards the serving BSC controlled a HANDOVER_COMMAND message containing the control for transfer of the mobile to the targeted cell. This control goes through the BSC controller and the serving BTS stations until it reaches the mobile, which carries it out to complete the handover procedure.

Analysis of the Technical Problem

The imminent introduction of the third generation mobile systems (3G), or UMTS (Universal Mobile Telecommunication System), poses significant compatibility problems with the existing second-generation PLMN systems. The UMTS systems are subject to international standards published by the 3GPP consortium (3rd Generation Partnership Project). In the sector of the 3GPP standardization, two technologies of radio access CDMA (Code Division Multiple Access) have been defined; they are respectively known as, TDD UTRA (Time Division Duplex UMTS Terrestrial Transceiver access), in which the transmission directions are different in the time domain, and WCDMA UTRA (Wide band CDMA), in which the transmission directions are different in the frequency domain. The TDD UTRA technology in turn foresees two options: a first broadband option known as 3.84 Mchips TDD, and a narrow-band option, known as 1.28 Mcps TDD. The Applicant of the present invention in collaboration with the Chinese Committee CWTS (Chinese Wireless Telecommunication Standards) is actively working on the development of a standard based on the physical level of the 3GPP 1.28 Mcps TDD standard, but re-employing many of functions and procedures of the highest levels of the GSM-GPRS protocol, offering the network operators a technology able to operate on the most part of the elements of the GSM network. This standard is known as TD-SCDMA (Time Division—Synchronous CDMA), or more precisely, TD-SCDMA System for Mobile (TSM).

Because of the importance of the CDMA technique in the 3G systems, it is useful to briefly introduce this technique saying that the same utilizes reciprocally orthogonal spreading codes sequences, or whose mutual correlation may be assumed as nul. Exactly this allows for discrimination between the different users who are totalled in the transmission band, since on a channel characterized by own code sequence, the signals of other channels, as correlation result, will appear as a noise. With respect to the narrow band traditional systems, the spread spectrum technique offers the advantage of a higher insensitivity to the Rayleigh selective fading, these latter being caused by multiple reflections along the on-air path of the transmitted signal, due the fact that the spectral portion interested in the strong fading is only a very small part of the spectrum totally occupied by the active signal. The second and third generation systems may take advantage from utilization of an intelligent antenna, adding to the existing multiplexing also the SDMA one, this opportunity is already provided for in the TD-SCDMA system.

Thanks to the higher transmission speed and flexibility of resources allocation offered by the CDMA technique, the third generation systems could offer the users a number of services and applications, particularly concerning the broadband data transmission. Furthermore, the TDD serviceability offers the advantage to configure the utilization band in "spectrum gaps" corresponding to areas in which the gap required for the utilization of the FDD technology (different bands for TX and. RX separated by an unused interval) is not complied with. An other advantage of the TDD duplexing compared to the FDD one, is the possibility to withstand a data asymmetric traffic, exactly like the one originated by the IP applications, allocating more resources in downlink than in uplink. On the other hand, the 3G systems require big investments both in economical terms (infrastructures ard research), and in terms of risk assumption. As said here above, introduction of the TD-SCDMA system will offer a promising possible answer to the fact of necessity to maintain the compatibility with the preliminarily existing system GSM (DCS), allowing for a progressive and with low risk transition from the 2G systems to the 3G systems. The purpose for the near future is to preserve, where possible, the functional characteristics of GSM, while intervening no the other hand any time the impact of the new 3G technology requires necessarily ad hoc solutions. During the first phase of its development, the TD-SCDMA network may be island distributed over the existing GSM-GPRS (or DCS) network, with which it will share an important part of the network as the Core Network (in the case of circuit switching represented by MSC, HLR, VLR etc.). During this phase of integration with the existing GSM or DCS network, the roaming between both the systems will be very high. An advantageous characteristic of mobile stations (but not necessarily compulsory) is that it is a multi-system (3G, 2G). In this case a 3G mobile will be able to avail of frequency disjoined bands of the different systems to select the best target cell to which it will be connected, it could communicate with the network even in geographical areas temporarily not covered by the new 3G system, but the most important aspect is that thanks to the innovations introduced by this invention in the operation mode of the station controller, the mobile will be able to perform a so-called inter-system handover, characterized by the change over for the mobile from 3G mobile transceiver access technology to the GSM (DCS) one, the vice versa is not yet allowed for because of the choice to speed up at the maximum extent the possible the introduction of the TSM standard without requesting modifications to the GSM standardization organizations (which ignores systems other than DCS), since such a request should require a lot of time.

Ad hoc solutions for the FDMA-TDMA technology are used in the GSM system, these solutions are not directly transferable to the telephone systems in the CDMA technology, at least as regards the radio interface, which is the one that poses the most important problems. Utilization of the same core network GSM, and/or DCS, for introduction of the 3G system, advantageous in many aspects, imposes furthermore to resolve the problem of proper signalling during the delicate handover procedure. It has been observed that to avoid modifications of the core network it is necessary to allow for a handover between the different technologies only from TD-SCDMA cells to GSM. This is however not yet sufficient in the case of external handover, since MSC is directly concerned ard it is necessary to safeguard the transparency of this important component of the GSM core network towards the new technology. The handover procedure described with reference to FIG. 2 regards an external handover between cells, all GSM, and cannot obviously be provided with useful learning for performance of a handover in presence of cells of different radio access technology.

Hereinafter two operation modes concerning the management of list of cells candidate for handover between the TD-SCDMA system and the GSM/DCS system could reasonably be assumed.

A first mode, already innovative in itself, could be that of compiling homogeneous lists of cells (all the cells of each list utilize the same technology) and in selecting from time to time a list to be forwarded to the MSC.

A second mode is that consisting in compiling only one "mixed" list including cells of both the systems.

Both the modes come from information forwarded by the mobile to the network through the MEASUREMENT_RESULT message originated by the dual-standard mobile connected in TD-SCDMA technology. This information on the status of connection (transmission power of the mobile, revel of signal perceived by the mobile on the cells adjacent to it, etc.) is crossed with the information known by the same BSS (power used in Downlink, static information relative to proximities, etc.). So, both the modes will only increase the probability of handover failure for a common reason that will appear immediately.

First mode: sending an homogeneous list of handover candidate cells to the MSC switch when this holds classmarks information (capacity of mobile in a system) that is inconsistent with the target system, and considering that by design choice the MSC switch does not have any possibility to distinguish between them the cells of both the systems, it is deduced that MSC cannot perform a conversion of the classmarks in order to make them suitable to the target system.

Second mode: considering that the start point for the commissioning of the new 3G system was to strictly avoid to bring out any hardware and software modification or adaptation to the MSC circuit switch, this important component of the GSM network "knows" only the GSM (DCS) world and ignores the existence of other access techniques (CDMA) associated with the GSM world, consequently if the above mentioned "mixed" list were forwarded to the MSC circuit switch this will not have any possibility to distinguish the cells of both the systems between them, and should consider all of them as GSM cells associated with the classmarks information stored during the set-up phase of the current call. As mentioned here above, the cause of handover failure is the same already evidenced, and i.e. the BSS system, target of the "shielded" system will interpret in the usual mode classmarks information (wrong) received by the MSC circuit switch relevant to the additional standard. In particular, if Classmarks information of the TD-SCDMA system are forwarded to the GSM (or DCS) BSS system target, it will interpret the values therein contained as if they were relative to the Classmarks Information of the GSM system, apposed at least it succeeds in decoding them.

The technical problem highlighted for the TD-SCDMA does not obviously exist for the multi-standard system formed by the GSM 900 MHz and the DCS 1800 MHz because the MSC circuit switch has provisions to support both the standards and to properly distinguish classmarks information (GSM and DCS do not have different classmarks but only optional fields or extended fields in the semantics).

An example will better clarify the technical problem. Among classmarks information of the mobile (Classmark Information) forwarded to MSC, are the power class, the ciphering algorithm, the multi slot capacity, etc. This information relates to the operation of the mobile in a system and they are different from the operation of the same mobile in the other system. Appendix 1 includes two tables: TABLE 1 indicates the power classes of the GSM mobile, TABLE 2 the power classes of the TD-SCDMA mobile. From the comparison of codes reproduced in these two tables it appears evident how coding 2 could indicate power values very different between them on the basis of the system to which it refers, i.e.:

8 W in the case of GSM 900
0.25 W in the case of DCS 1800
1 W in the case of TD-SCDMA.

The example relevant to the power class of the mobile is applicable to Classmark2 information having the same message structure in both the GSM (DCS) and TD-SCDMA systems, but having different semantics. There are also Classmark3 messages completely different in both the systems in terms of structure and information, therefore they are not directly comparable between them; an example peculiar to the TD-SCDMA access technology is the time switching capacity between the downlink direction and the unlink direction. Obviously nothing similar exists in the GSM since devoid of sense in FDD technique. It is useful to remember that on the basis of classmark communicated by the base station of the serving system and stored by the MSC circuit switch, this late initiates a handover procedure including classmarks information received from the serving BSS system in the HANDOVER_REQUEST message.

A second problem consequent to the new mobile scenario and to the restriction on the core network is that of the design setting of the station controller. The TD-SCDMA system does not come cut as an autonomous system but for sharing, at least at its initial phase, the GSM core network. The new 2G+3G network is therefore formed by a core network common to two different access networks. Each access network sees its own functionalities mainly concentrated in the base transceiver stations and only partially in the station controller. The station controller is in the middle between its own access network and the circuit switch MSC that belongs to the common core network. From the operational point of view, the station controller accepts at input flows of bits from each access network having the same frame organisation and conveying messages regulated by similar protocols, and furthermore it provides with standard connections at output regardless of the origin of the input information, the use of two different controllers for both the access technologies seems therefore not being cost saving.

OBJECTS OF INVENTION

Scope of the present invention is to define a station controller for cell-phone base transceiver stations characterized by different access transceiver technologies able to connect the base stations of the different typologies to one common core network GSM, operating in such a way to enable the management of external handover between a cell of technology other than GSM and a GSM cell through the MSC in a mode transparent to the GSM core network.

SUMMARY AND ADVANTAGES OF INVENTION

To achieve these objectives, scope of the present invention is a station controller for cell-phone base transceiver stations characterized by radio access technologies different between them, including external handover control means, as described in the appended claims.

The new station controller undertakes the task to select the most suitable access technology to support the external handover; selection is materialized through the preparation of lists of homogeneous cells according to radio access technology and forwarding only one list inherent to the preliminarily selected technology to the circuit switch MSC. Furthermore it is the same station controller that provides for avoiding the failure of the external handover, checking first the information on the capacities of the mobile (classmarks) featuring the MSC circuit switch, and successively, only in case these classmarks are not cosistent with those that can be referred to the preliminarily selected list, updating the classmarks of the MSC circuit switch. Thanks to updating of the classmarks, the external handover procedure can be successful. It must be pointed out that the classmarks information stored by MSC is still the one forwarded to it by the station controller and therefore its checking does not require exchanges of messages with MSC. Considered that at the set-up of any new connection the mobile sends its classmarks to the network with respect to the access technology employed in order to establish the connection, it results that under normal conditions the classmark switching should occur during the transfer for handover of the mobile from a 3G cell to a GSM cell; this means that if the external handover involves two 3G cells the classmark switching cannot occur, even having recourse to an MSC that does not know the used classmarks (it must be considered that MSC memorizes the classmarks regardless of their content, but it "keeps them ready" for the BSS target system, which is the true recipient of this information). However in the cases of abnormal events, as for example the failure of the external handover, or other, it can occur that the classmarks held by MSC do not coincide any more with those transferred during the call set-up, which must be restored.

As previously said, recommendations have not yet made provisions for the handover from GSM towards TD-SCDMA, therefore what is presented is then an "asymmetric" inter-system handover i.e. with one direction only, while in reality the dual-standard mobile succeeds in carrying out measurements in both the systems and should therefore have the capacity to support a "symmetric" handover. But this is the price to pay to this imposed constraint. With a dual-standard mobile, the asymmetric inter-system handover is obtained as follows:

If the mobile is connected to a GSM cell it shall ignore the new 3G technology, besides the GSM standard does not provide for occurrence of measurements on the 3GG frequencies and a hangover request towards TD-SCDMA in fact cannot be transmitted.

If the mobile is connected to a TD-SCDMA cell, the base station prepares the MEASUREMENT_RESULT message made with the contribution of measurements carried out by the mobile unfit in the adjacent cells of both the systems; then, the same base transceiver station evaluates the existence of conditions for a handover, if such conditions exist it transmits a request of inter-cell handover mot included in a mixed list 3G+GSM of candidate cells to the new station controller. The processing the. MEASUREMENT_RESULT message inside the base transceiver station is a common engineering practice that enables to spare resources on the AbisM (or Abis for GSM) interfaces. The station controller based on the mixed list prepares the way to the external handover according to the teachings of the present invention. Unlike the station controller BSC of the GSM, which does not know the other technology, the new station controller knows both them (even if the higher impact burdens on the 3G base transceiver station) and exploits the GSM messages to "mislead" MSC and make the inter-system external handover transparent to MSC. Assumed that MSC has no means to promote an inter-system handover (at highest, a handover with DCS is authorized) because the standard does not provide for the existence of an other system, the misleading consists in the change of the information possessed by MSC on the capacity of the mobile before the MSC the handover request forwards to the target cell, including the mobile's classmark corrected for the system towards which it is going. The new capacities of the mobile, that the 3G controller already knows, shall be those used in the target cell. It can be then argued how, starting from a 3G serving cell, the mobile can be switched on a GSM target cell without that MSC recognizes it, and the new cell will serve the mobile in a proper way.

The GSM+3G system takes advantage from the transparency of the GSM core network over the 3G access network, since in the contrary case it should be necessary to intervene on a highly standardized network element (MSC) and actually durably used, or it should be necessary to abandon also the handover from 3G to GSM because it could not be implemented without the arrangements of the invention.

Advantageously, the architecture of the new station controller is suitable to serve TD-SCDMA and GSM base transceiver stations sharing the same service area, and to provide with a sole connection towards the common core network GSM, complying at the same time with the operation singular features of the two access networks. In particular, this means that:

if the mobile is only GSM, the station controller operates like a traditional BSC ignoring the 3G technology;
if the mobile is 3G only, the station controller is able to sere it exploiting the GSM core network;
if the mobile is dual-standard the station controller is able to serve it in the previously said way allowing for inter-standard passages.

A further object of this invention is a external handover method that can be performed through the station controller, scope of the invention, as described in a method appended claim.

Further object of this invention is an alternative method whose purpose is to speed up the inter-system external handover at the maximum extent, very critical in itself. The variant foresees to acquire the classmarks of all radio access technologies supported by the mobile, which could be needed later on, already during the signalling phase accompanying the connection of mobile to the network. To this purpose, after the mobile has accessed the network and has sent, spontaneously or on request, the classmarks relative to the system it is connected with, the station controller analyses and stores them and then requires the classmarks of the other systems through appropriate messages valid in each system. Upon arrival of the new classmarks, these are also locally stored, so that they result immediately available in case of need, without loosing further time in their request or while waiting for the reply.

The invention together with further objects and advantages thereof could be clearly understood from the following detailed description of embodiments of the same and from the attached drawings in which.

DESCRIPTION OF SOME PREFERRED EMBODIMENTS OF THE INVENTION

Figure 1:
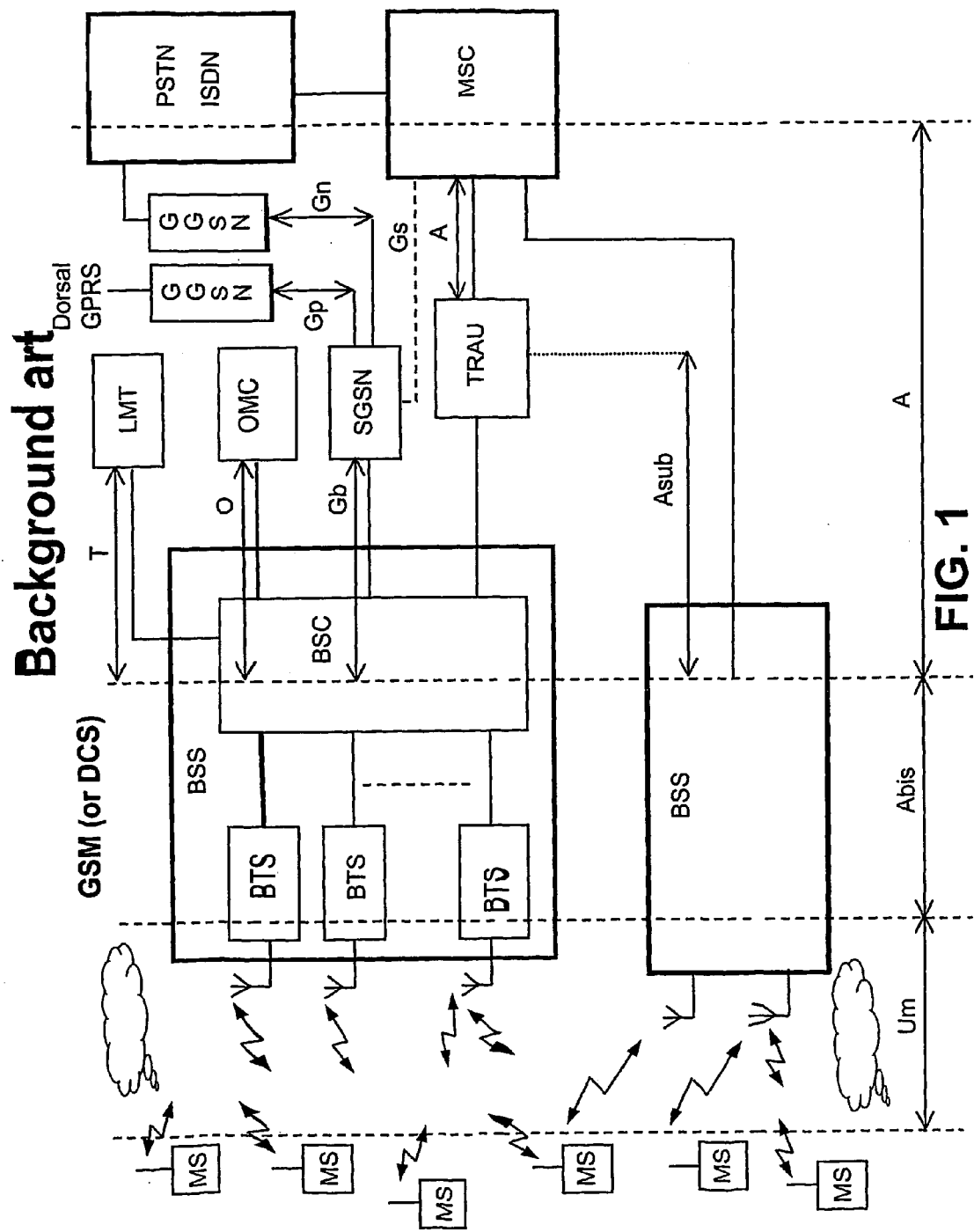
FIG. 1 (already described) shows a block diagram of a GSM-GPRS or DCS system.
Figure 2:
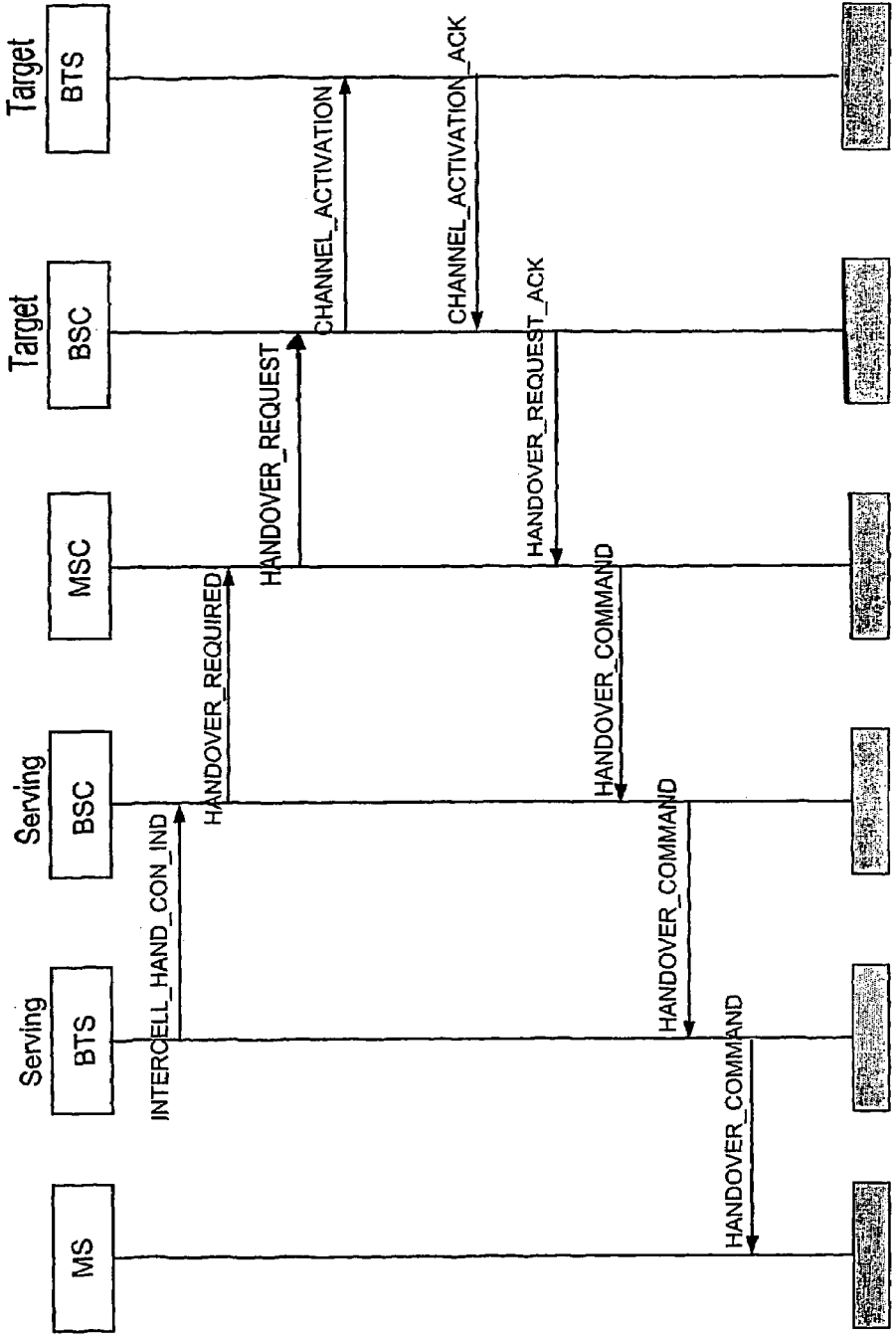
FIG. 2 (already described) shows the time evolution of the main messages exchanged between the network elements during a external handover procedure in the GSM sector.
Figure 3:
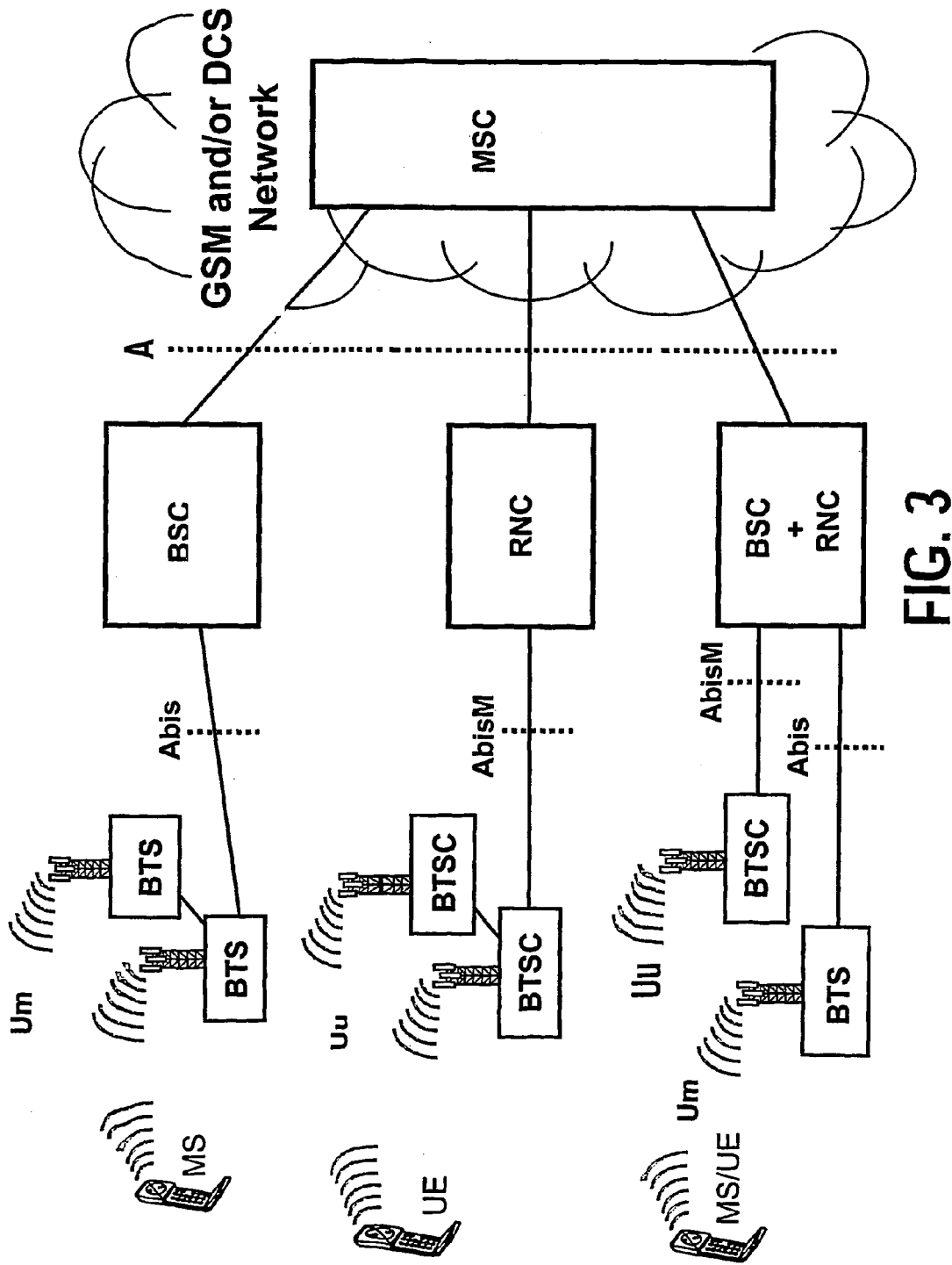
FIG. 3 shows a mobile scenario that sees GSM (DCS) base transceiver stations connected to a station controller BSC, TD-SCDMA base transceiver stations connected to a station controller RNC (Radio Network Controller), and GSM and TD-SCDMA base transceiver stations sharing a same site connected to a station controller summing up the functions of the relevant BSC and RNC controllers.

FIG. 3 shows a mobile transceiver scenario including GGSM cells and TD-SCDMA cells, for simplicity the borders of cell are not shown in the figure. The GSM cells are served by as many base transceiver stations BTS of the GSM (DCS) system, while the TD-SCDMA cells are served by as many base transceiver stations BTSC (Base Transceiver Station for TD-SCDMA) of the TD-SCDMA system, called also Node B. Since any cell of a system is served by its own BTS/BTSC, the term cell and BTS/BTSC may be considered as synonyms. Since the frequency bands are separately employed by both the systems, a same geographical cell can have a radio coverage from both the systems at the same time, and therefore a same geographical area may be covered at the same time by one GSM cell and by one TD-SCDMA cell. A set of mobile units is radio connected with a relevant base station among those visible in the figure. The mobiles can be radio access single technology or profitably they can support both the technologies. The air interface between BTS stations of the GSM system and the respective MS (Mobile Station) mobiles is the Um interface, while the air interface between BTSC stations of the TD-SCDMA system and the respective mobiles UE (User Equipment) is called Uu. In a preferred embodiment of the present invention the mobile unit shall be able to indiscriminately operate in accordance with one or the other standard, this dual-standard mobile unit is denoted MS/UE. The MSC switch is the one used in the GSM network, without any modification. On the connection lines between the different blocks, the boundaries and the denominations of the different interfaces are indicated by dotted lines. On the connections between the BTS stations and the BSC controller an Abis interface is represented, while on the connections between the BTSC stations and the M-BSC controller an interface obtained by modification of Abis in order to better adapt it to the requirements of the new physical level is indicated by AbisM. On the Abis and AbisM interfaces the physical level and messages of levels 1 and 2 are identical, while the messages of level 3 are in general different. On the connections between the BSC controller and the MSC switch the interface A of the standard GSM is shown. In the figure a practical case is shown (at the left bottom) in which a base station GSM (DCS) and a base station TD-SCDMA are co-located and connected to only one station controller BSC+RNC, even if the Abis and AbisM interfaces are separate. The BSC+RNC controller sums the functions of the single controllers in accordance with the methods scope of this intention. It can be noticed in the figure that the new TD-SCDMA system shares the circuit switching supporting structure of the already existing GSM system, and the relative interface A for the transport of voice, data and signalling from and to the network. As far as signalling protocols are concerned, the usual GSM procedures for call control (Call Control) and the management of user mobility (Mobility Management) residing for the most part in the MSC network node remain shared.

Figure 3A:
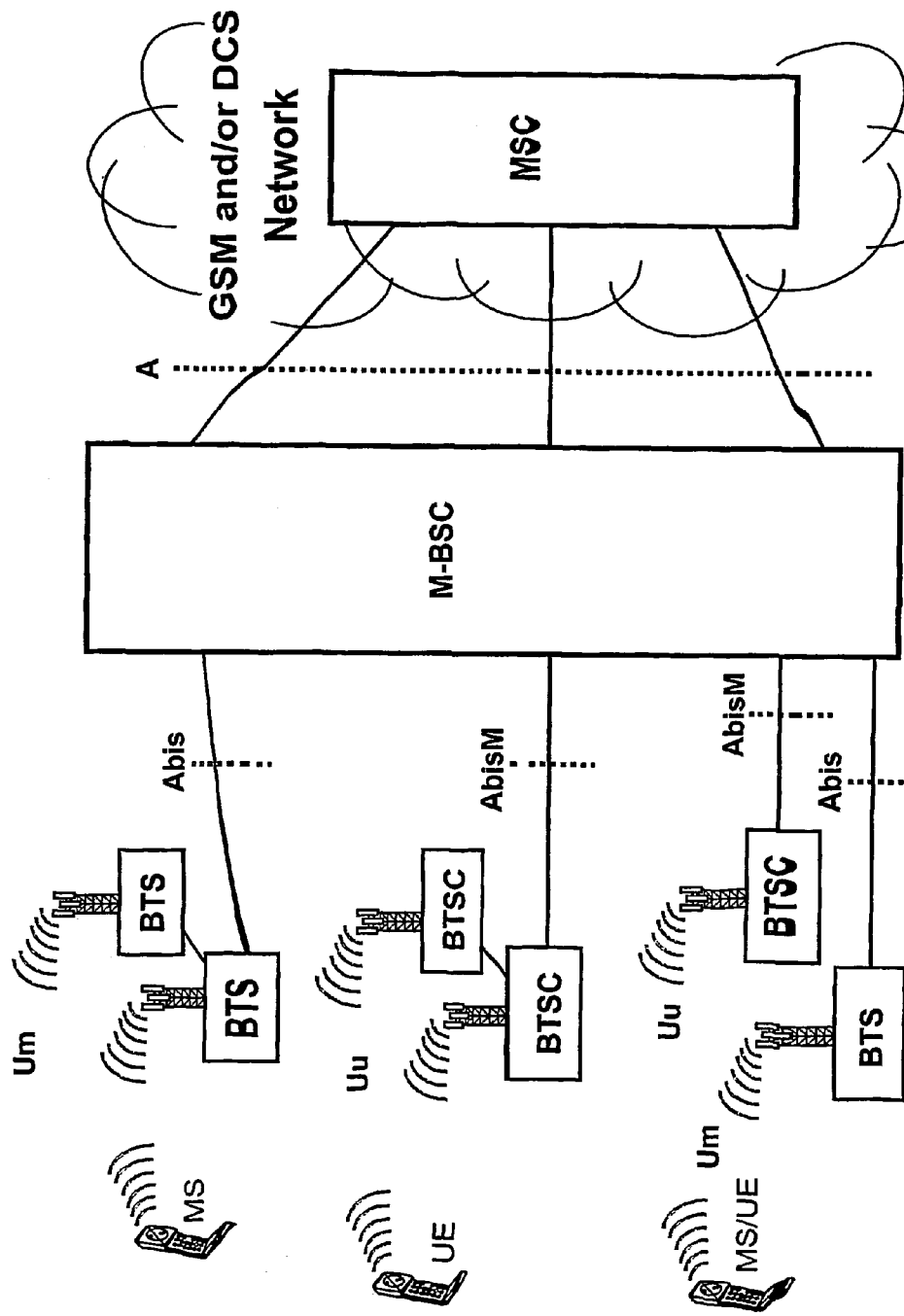
FIG. 3a differs from the previous one by the presence of a sole M-BSC station controller implemented in accordance with the present invention.

FIG. 3a differs from the previous FIG. 3 in that the different base transceiver stations are connected to only one station controller M-BSC, in turn connected to the MSC switch through a sole connection of interface A. The scenario is suitable for a generalization that sees the territory subdivided in cells shared by several base transceiver stations, each one using a transceiver access technology different from those used by the other stations. The above mentioned technologies being those used in the systems of either second or third generation, preferably subject to sectorial standard, but also even simply proprietary, or some standard or other proprietary. The mobile being of single access technology or advantageously supporting two or more possible access technologies. The base stations being connected to the common controller M-BSC through the respective interfaces that may differ one from the other. The core network being the one developed for only one of these technologies. Architecture and operation of the controller M-BSC will be analysed with reference to the following examples.

Figure 4:
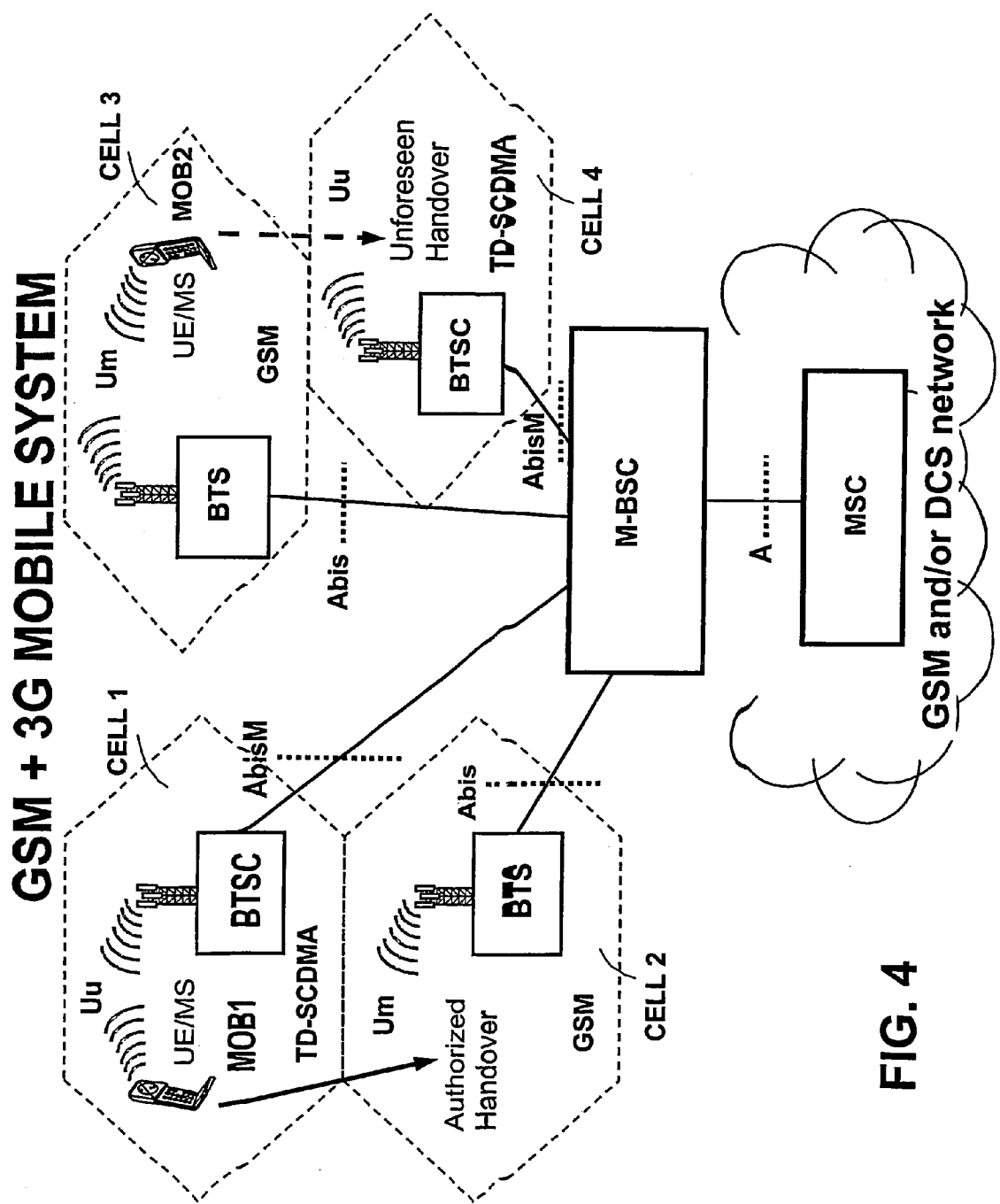
FIG. 4 shows examples of internal inter-cell handover in a mobile transceiver scenario that provides for GSM cells and 3G cells.

FIG. 4 represents a deal-standard MOB1 mobile of MS/UE type that is moving from a cell 1 of BTSC type, to which it is connected, towards a cell 2 of BTS type with the purpose to perform an inter-system handover. In this case the handover is authorized. The figure shows also the case in which a dual-standard mobile MOB2 of MS/UE type is moving from a cell 3 of BTS type, to which it is connected, towards a cell 4 of BTSC type; in this case the handover is not provided for.

Figure 5:
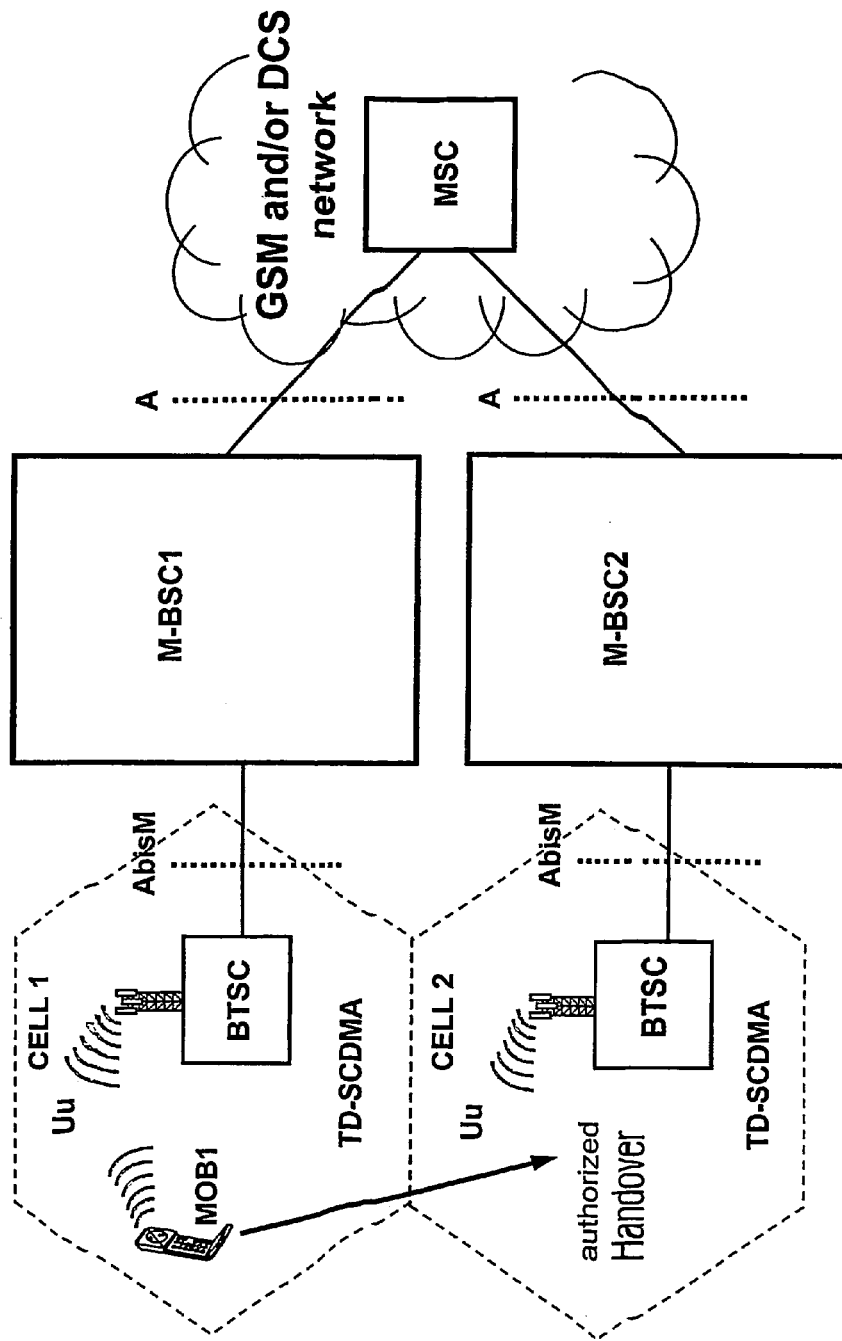
FIG. 5 shows am external handover between cells of the same 3G system.

FIG. 5 shows a case in which two station controllers M-BSC1 and M-BSC2 connected to respective cells 1 and 2 both served by own. BTSC are present. Each controller is furthermore connected to the MSC circuit switch of the GSM network through an interface A. The figure shows a mobile MOB1 served by the cell 1, belonging to the area of t he controlled M-BSC1, that is moving towards the cell 2 belonging to the area of the controller M-BSC2. The scenario of FIG. 5 shows the peremptory involvement of the circuit switch MSC for performance of the handover, since the serving cell and the target cell belong to BSS systems that do not directly communicate between them but through the network, represented exactly by the node MSC. In this case the handover is called external handover and in the case considered it is also called inter-system.

Figure 6:
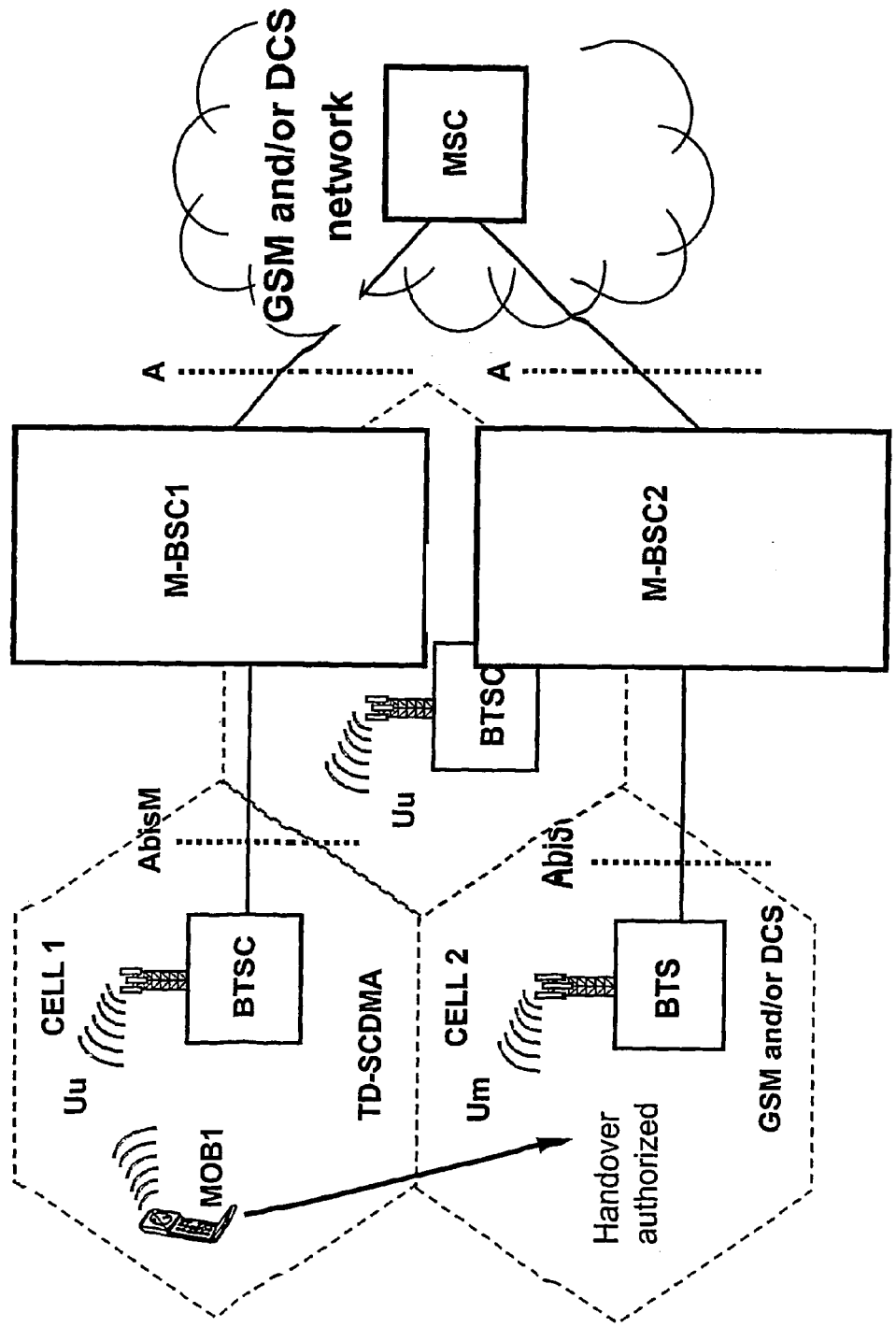
FIG. 6 shows an external handover from a 3G cell to a GSM cell.

FIG. 6 differs from the previous one due to the fact that the cell 1 is of type BTSC while the cell 2 is of type GSM, furthermore it is also visible a third cell of type BTSC. In this case of authorized handover, the external handover is called inter-system and is object of a preferred embodiment of this invention. The scenario representing cells having equal dimensions for both the typologies of radio stations is obviously a simplification made for illustration purpose; actually the cells of the different mobile systems rather have different geometrical shapes and areas.

Figure 7:
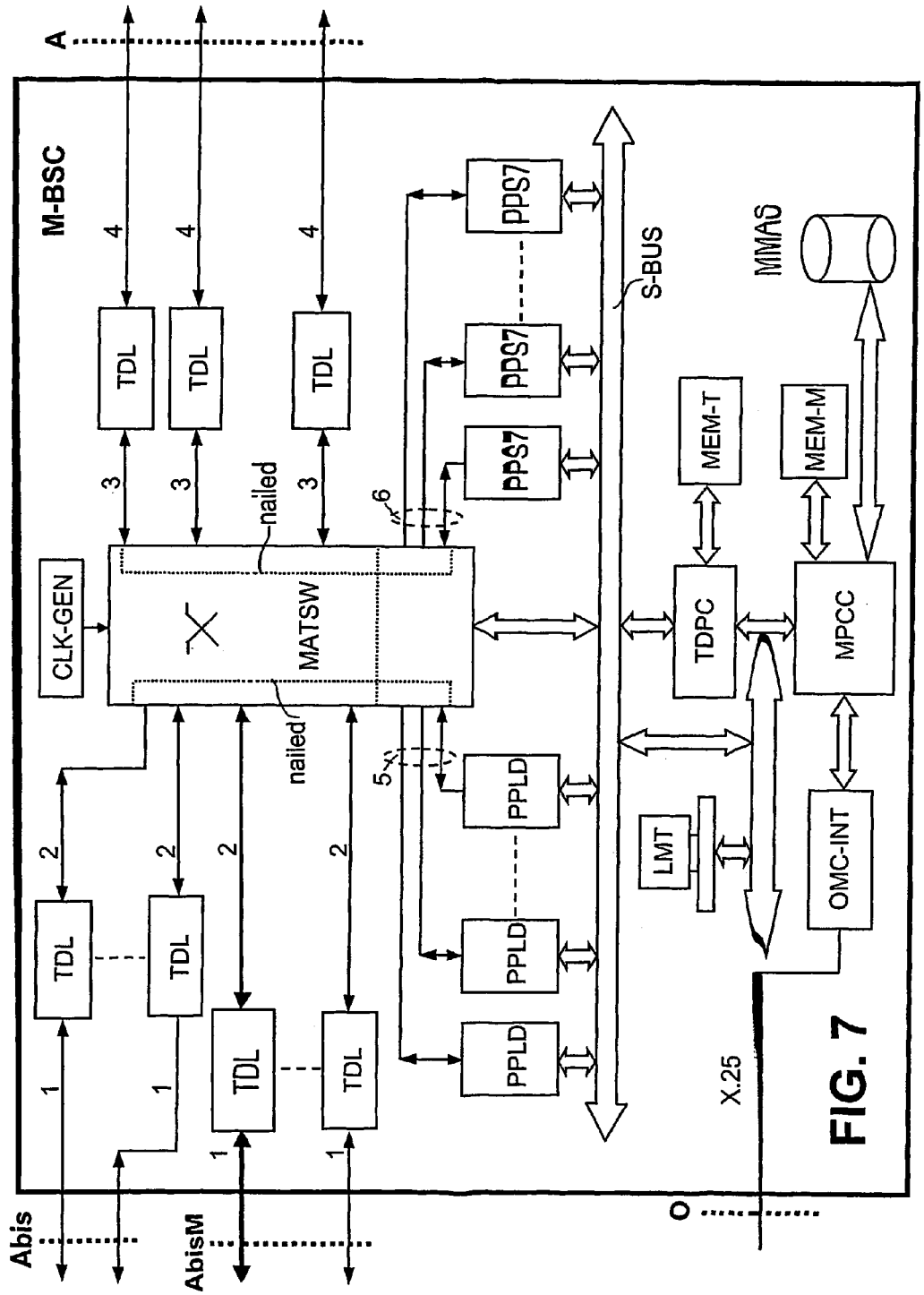
FIG. 7 shows the internal architecture of a station controller M-BSC of the present invention.

FIG. 7 shows a higher detail of the controller M-BSC of the previous figures. The M-BSC controller includes the following blocks: TDL, MATSW, CLK-GEN, PPLD, PPS7, TDPC, MEM-T, MPCC, MEM-M, MMAS, OMC, and LMT. The TDL blocks of a first group are connected to the base transceiver stations BTS of the GSM system by means of the numerical lines 1 and to the switch matrix MATSW by means of the numerical lines 2. The TDL blocks of a second group, identical to the previous ones, are connected to the circuit switch MSC of the GSM network by means of the numerical lines 3 and to the matrix MATSW through the numerical lines 4. The PPLD blocks are peripheral processors for LAPD signalling connected to the matrix MATSW through the numerical lines 5, and moreover connected to the system bus S-BUS. The blocks PPS7 are peripheral processors of SS7 signalling, connected to the matrix MATSW through the numerical lines 6, and moreover connected to the system bus S-BUS. The TDPC block is a telephone processor connected to the system bus S-BUS and to a block of memory MEM-T. The block MPCC is an administrative processor, connected to the system bus S-BUS (of which it is the origin), to a memory block MEM-M, to a mass memory MMAS, an interface OMC-INT of X.25 type towards the Operation and Maintenance Center OMC, and an other towards the local terminal LMT (PC). The block CLK-GEN includes a high stability oscillator that generates a crock signal from which all timing used by the internal blocks of the M-BSC controller are obtained.

Lines 1 are unidirectional lines in both the transmission directions that convey serial numerical flows conforming to the A-bis and AbisM interfaces. The above-mentioned flows are of the PCM 2048 Kbit/s (T2) type, as by CCITT G. 703, and include 64 Kbit/s traffic and signalling channels. The signalling is based on the LAPD protocol (Link Access Procedure on the D-channel), as per recommendations CCITT Q920, Q921. A LAPD signalling channel, called also "D channel", is associated with a preliminarily fixed number of traffic channels, maximum 30 full-rate. The possibility to replace also a 64 Kbit/s LAPD signalling channel by one or more 16 Kbit/s channels is also foreseen. Two typologies of flow 1 are visible in the figure, the first typology includes signalling that concerns the sole Abis interface, and the second one concerning the sole AbisM interface. The conversion operation from interface Um to A-bis, and vice versa, is mainly carried out by the BTS, this implies the conversion of coded voice channels TCH in accordance with the GSM standard in 8 bit time slot PCM, and the conversion of signalling protocols from LAPDm (LAPD suitable for the mobile) to LAPD. A dual conversion is performed between Uu and AbisM interface of the TD-SCDMA system by the base station BTSC.

Lines 3 are unidirectional lines in both the transmission directions that convey serial numerical flows conforming to the interface A. The above-mentioned flows are they too of the 2048 Kbit/s CCITT G. 703 PCM type, comprising 64 Kbit/s traffic channels and signalling channels of the Common Channel CCITT No. 7 type. One of the signalling channels is used for the implementation of interface O, based on the protocol CCITT X.25, provided for between the Operation and maintenance Center and BSC. Lines 5 and 6 are respectively as lines 2 and 4.

The MPCC block is an administrative processor controlling and supervising the entire operation of the M-BSC controller; as such, it has at disposal a standard interface (duplicated) towards all the blocks of M-BSC, considered as peripheral, to which it is connected through the system bus S-BUS (duplicated) of addresses, data, and control signals. Two pairs of MPC operating in active/hot-standby configuration are provided for; each MPCC block includes a circuit that implements the logic for configuration and control of the M-BSC block as regards the redundancies. Said circuit generates the signals for the pair selection used by the peripheral blocks to select the bus of the active pair to connect with.

Each PPLD block is a peripheral processor that manages the LAPD protocol signalling on the Abis/AbisM interface, for N (=4) 64 kbit/s channels from/to BTS/BTSC. The PPLD block includes a CPU connected to a double port RAM memory having both reading and writing independent accesses that interfaces the telephone processor TDPC; furthermore, it includes an interface towards the matrix MATSW, and an interface towards the administrative processor MPCC. The CPU develops the level 1 and 2 fields of received messages, i.e. it carries out the LAPD protocol.

Each PPS7 block is a peripheral processor controlling the CCITT No 7 signalling (CCSS No. 7, or SS7) on the interface A. The architecture of this block is similar to that of the PPLD block.

The TDPC block is a telephone processor controlling the GSM typical application processes relevant to the call control and to the administration of radio resources on the basis of the users' mobility. Furthermore, it is competent for the exchange of messages between the peripheral PPLD and PPS7 signalling processors, which implies the conversion between LAPD and CCITT SS7 protocols of exchanged messages.

The TDL blocks represent line terminations for the 2048 Kbit/s 1 and 3 PCM lines, and furnish the interface between these lines and a duplicated switching network represented by the MATSW block. As such, the TDL blocks perform all the functions that a known termination shall normally carry out, and i.e.: equalization of the incoming signal from which a clock signal is obtained that can be possibly used to time the different circuits, conversion of line codes into signals suitable at the different entry levels of the logical circuits employed, provision for an elastic memory to compensate line delays and for plesionchronous operation, detection of on-line alarm conditions, extraction of frame synchronisms, BER measurements, etc. Furthermore, the function for extraction/insertion of the 64 Kbits/second signalling channel towards the Operation and Maintenance is also included. Each TDL block has its own line controller interfacing with the administrative processor MPCC, with which it cooperates for supervision and maintenance. The connections between the TDL blocks of Abis and AbisM interfaces and the switch matrix MATSW are denoted with 2; the connections between the TDL blocks of interface A and the MATSW matrix are denoted with 4.

The switching matrix MATSW gives the bi-directional connections between the 16 or 64 Kbit/s traffic channels present on the lines 3 of interface A and the traffic channels present on the lines 1 of Abis and AbisM interfaces. The matrix is required since the above mentioned channels are distributed in different ways between the two groups of lines, lines 3 are in general equipped in minor number since they are longer and more expensive, therefore they must be more heavily exploited. An other important function of the MATSW matrix consists in realization of half-permanent connections ("nailed up") for the signalling channels towards the peripheral processors PPLD and PPS7. To this purpose, the LAPD signalling time slots that transit on lines 2 towards MATSW are extracted and inserted in 2 Mbit/s serial numerical flows consisting of signalling channels only, conveyed from lines 5 towards the peripheral processors PPLD. Reciprocally, the PPLD signalling channels generated by the above mentioned processors PPLD constitute the time slots of 2 Mbit/s serial numerical flows of signalling channels, carried by lines 5 towards the matrix MATSW. Absolutely similar operations occur as regards the distribution of signalling channels CCITT No 7 from lines 4 towards the peripheral processors PPS7, and vice versa, through lines 6.

The personal computer PC dialogs with the administrative processor MPCC and performs the man/machine interface for the start of operations, as for example: initialization, software loading from the mass memory MMAS, diagnosis, etc. Being the diagram in FIG. 7 of general character, it does not refer to a case of actual on site installation; therefore, provided that a M-BSC controller is implemented in one or more folders, the quantity of the different folders is not indicated. Concerning the number of folders related to the MPCC, TDPC, MATSW, and CLK-GEN blocks, it is constant for M-BSC; while as regards the number of folders related to the TDL, PPLD and PPS7 blocks it will be determined at any new installation on the basis of the telephone traffic forecast for the mobile service in the area served by that M-BSC controller. Said number is also redounded by one unit for reliability reasons.

Figure 8:
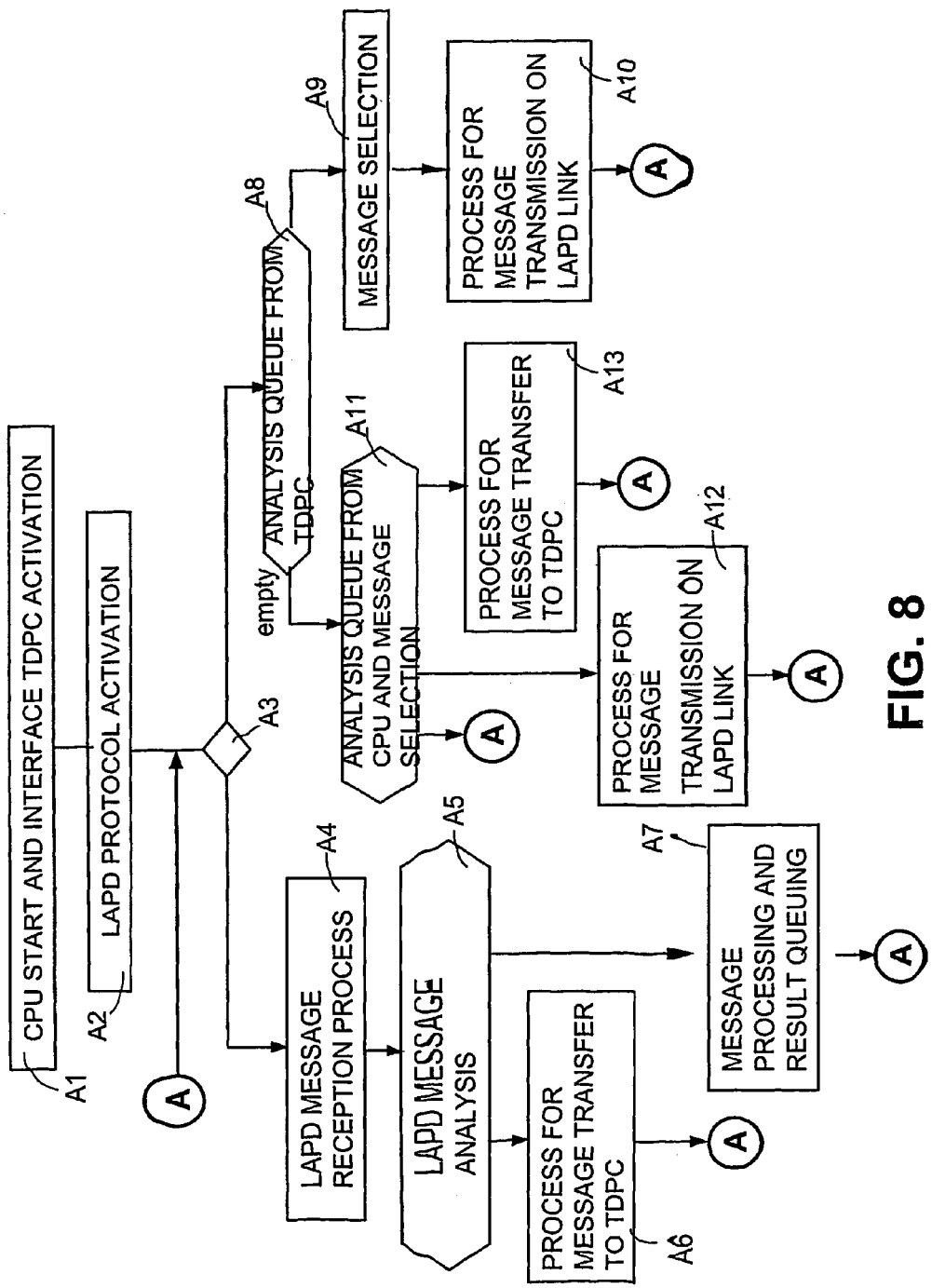
FIG. 8 gives a representation of concurrent processes for message processing and distribution carried out by a PPLD processor included in the controller M-BSC of FIG. 7.
Figure 9:
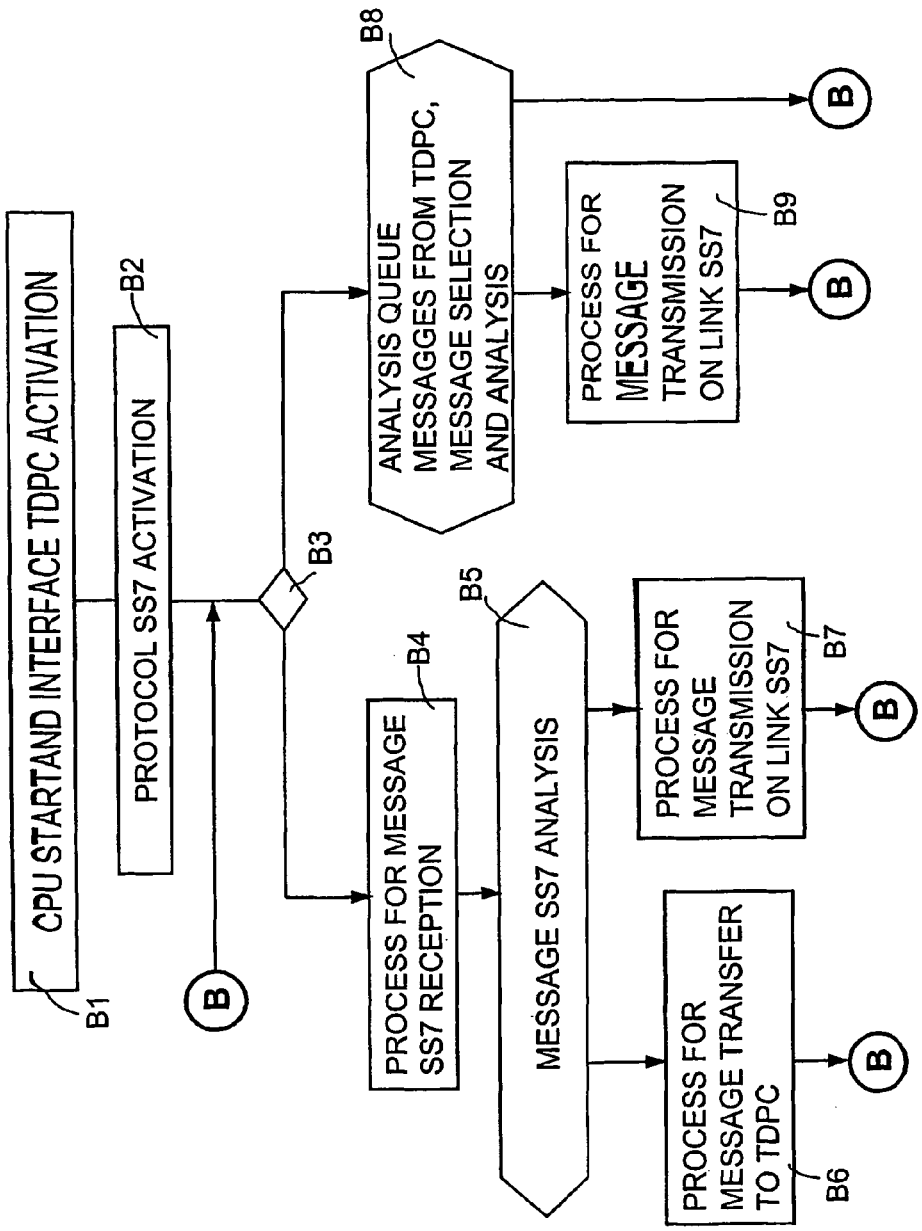
FIG. 9 shows the process for message analysis and distribution carried out by a PPS7 processor included in the M-BSC controller of FIG. 7.
Figure 10:
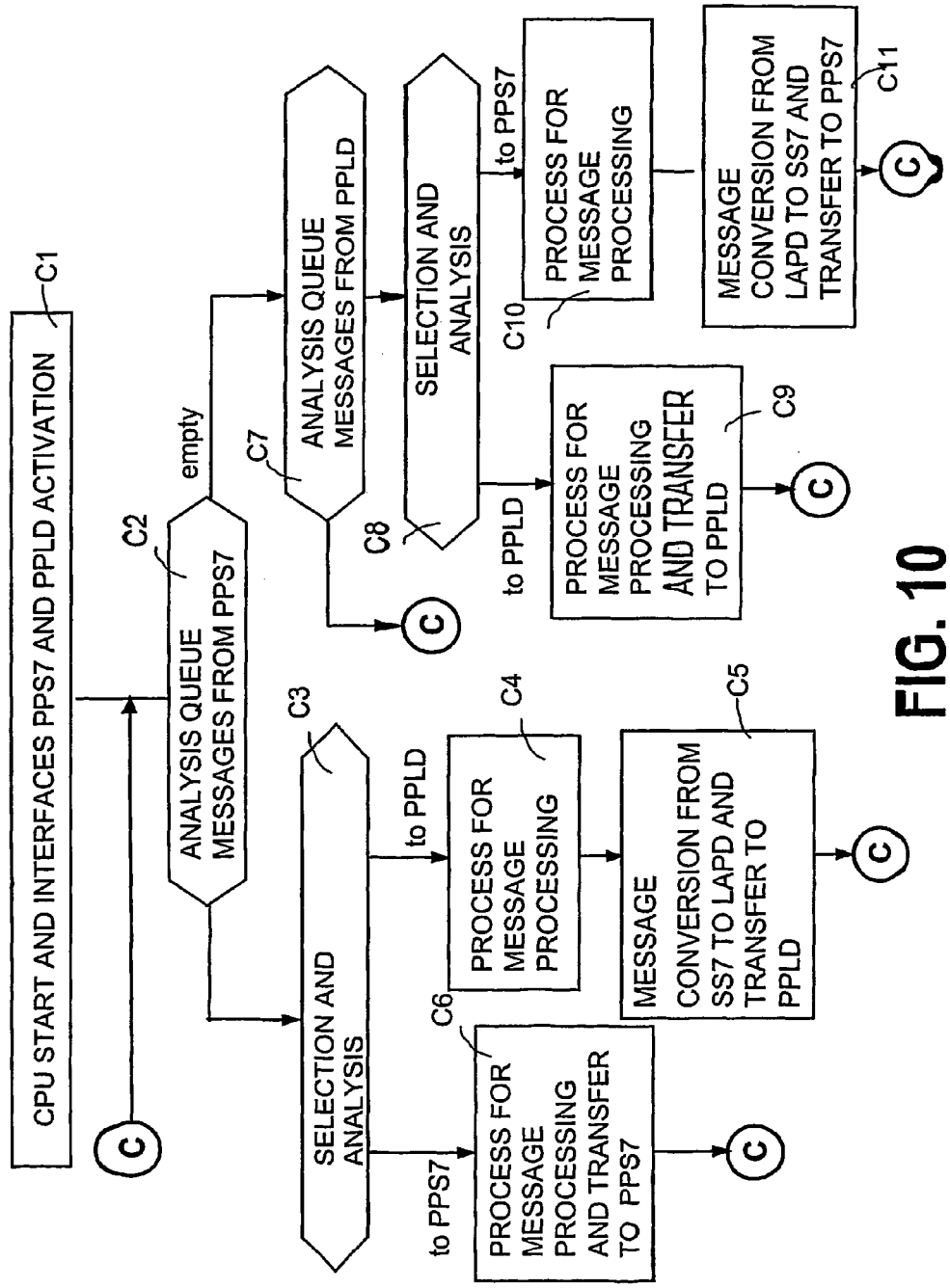
FIG. 10 shows the message analysis and distribution process carried out by a TDPC processor included in the M-BSC controller of FIG. 7.
Figure 11:
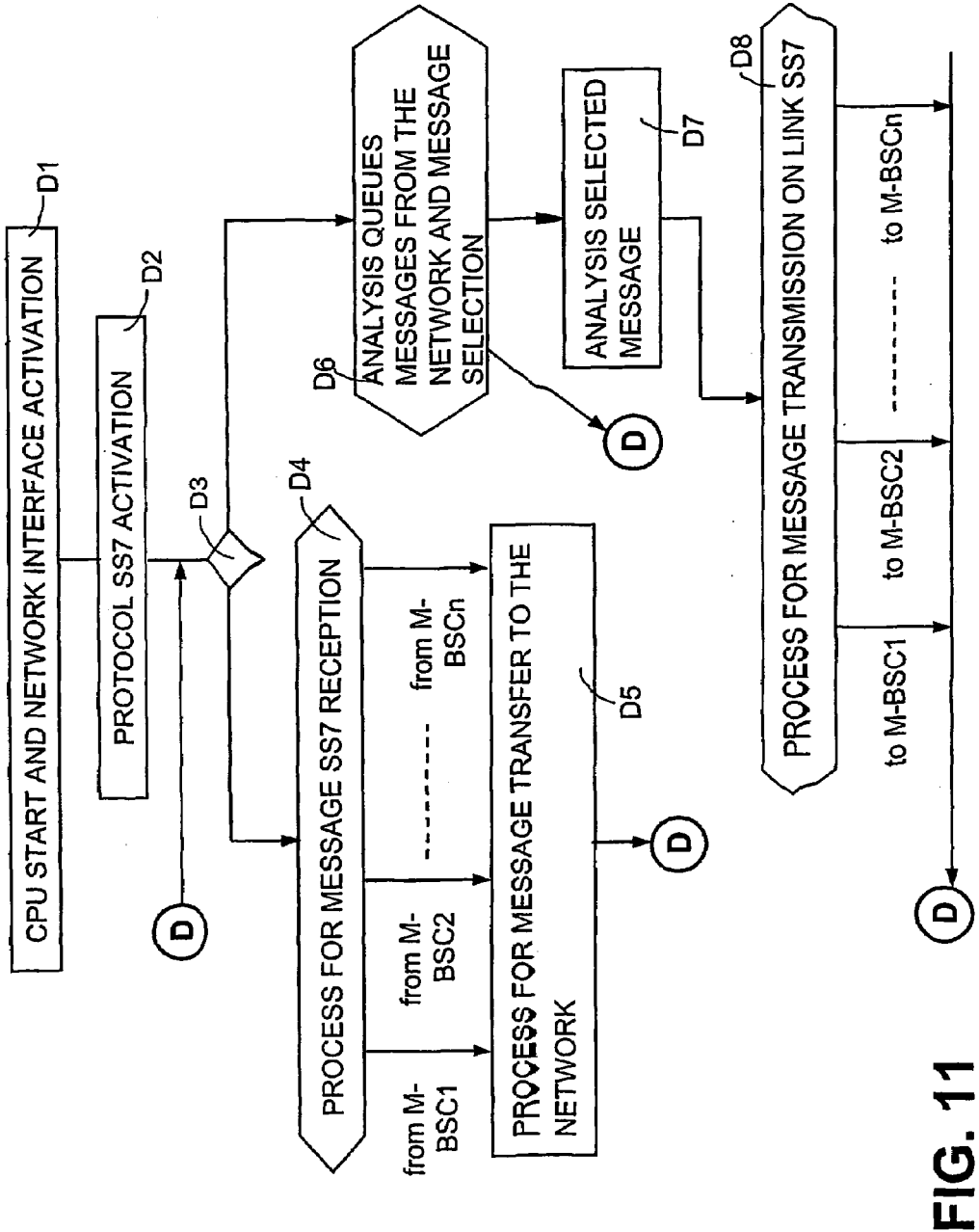
FIG. 11 shows the message analysis and distribution process carried out by a circuit-switching node MSC of FIG. 6.
Figure 13:
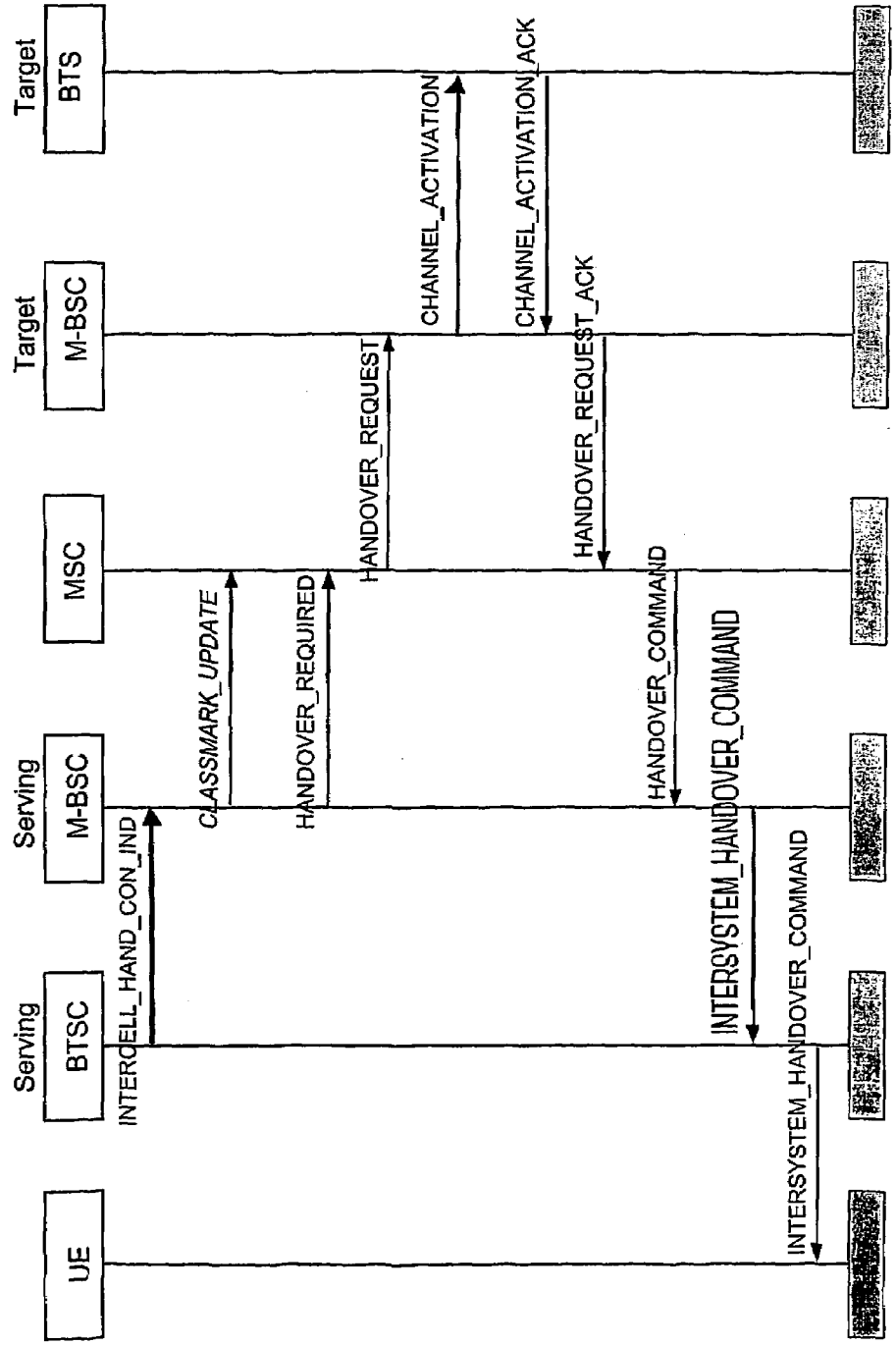
FIG. 13 shows the flow of messages exchanged during an external handover from 3G to GSM, according to the present invention.
Figure 14:
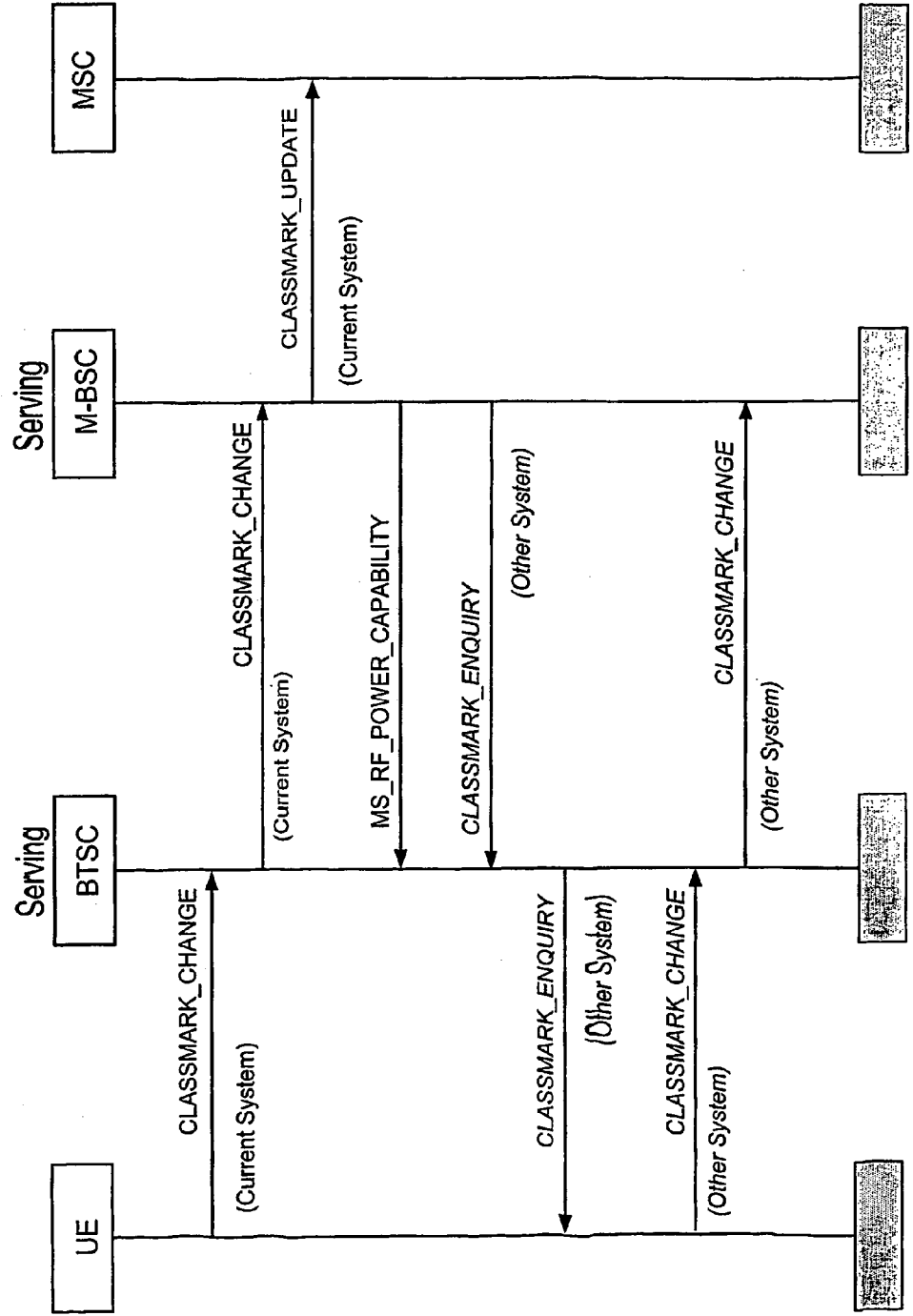
FIG. 14 shows an alternative to the method of FIG. 13 aimed at the optimisation of the inter-system external handover.
Figure 15:
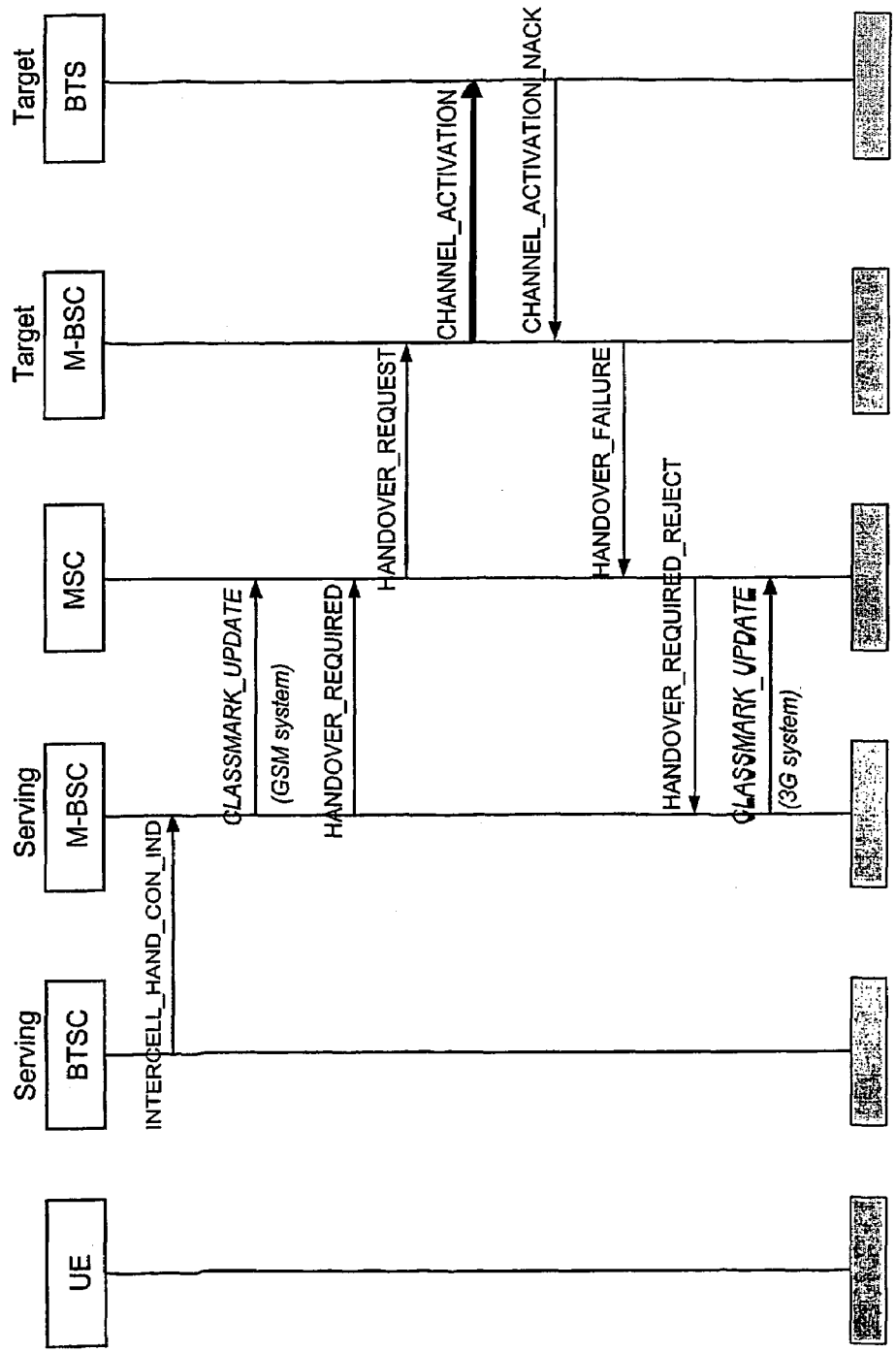
FIG. 15 shows an example of failure of the handover procedure.

FIGS. 8 to 10 briefly show the processes of queuing, analysis and transfer of signalling messages between the different interfaces included in the M-BSC station controller, in such a way that the signalling messages coming from network first elements on the interface with the exterior, i.e. the Abis, AbisM, and A interfaces, may be readdressed, after possible processing, towards second network elements that communicate through the above mentioned interfaces. The transfers not falling under the addressing capacity of the M-BSC block, but falling under MSC, are shown in FIG. 11. The capacity to transfer signalling messages between network elements, or also inside a single element, is the true reason of the existence of the communication protocol. Indeed, it is only through an ordered sequence of messages between the network elements involved in a process, that a bi-directional flow of useful information can be established for the control of the different phases characterizing that process; as for example, the phases of establishment, holding and ending of a call, with all the involvements of the users' mobility. A possible consequence of the users' mobility in the new 2G–3G scenario is to be compelled to perform a handover towards a cell supporting a different radio access technology. The messages affecting the M-BSC controller, are obviously multiple, some are generated by the mobiles, MS or UE, other by the BTS or BTSC stations, other are internally generated, and other by the MSC node Some messages simply cross the M-BSC controller between the LAPD and SS7 interfaces in a transparent way, other undergo an internal processing, as for example the preparatory messages of the external handover of the present invention Each LAPD or SS7 message includes fields for identification of the starting and arrival point of the message, a field indicating the type of message, fields that indicate the physical resources used by the message (frequency, timeslot, code, etc.), plus other control fields. All the information included in all these fields makes the transfers possible and reliable. The names of the different messages are defined by the recommendations GSM/TSM 01.04, while their specific format is described in the relevant recommendations. As regards the present invention, a large part of signalling messages processed, as well as the entities of source ard destination of messages, are shown in FIGS. 13 to 15.

FIGS. 8 to 10 do not shown any exchange of messages between the administrative processor MPCC and the remaining blocks visible in the M-BSC controller. This does not mean that no exchange of information occurs; actually, information mainly concerning the hardware and software configuration, the operations to be undertaken for maintenance and the values of some E&M parameters used in the application programs, are exchanged between MPCC and the remaining blocks. The above-mentioned information however does not fit the typology of messages, that is, how they are considered from the point of view of signalling.

With reference to FIG. 8 it is described the signalling message exchange process concerning the PPLD block. The process starts from the step A1 of START in which the internal CPU initialises the interfaces with the telephone processor TDPC. In the next step A2 the CPU activates the LAPD protocol sending predetermined frames to all the transceivers of the connected BTS and BTSC, that must reply in the expected way to cause the respective LAPD links to be effective. Afterwards, in A3 the CPU enters an interrogation cycle of a reception interrupt flag of a message on the LAPD links. In the case of reception, a process of message reception is carried in A4 out that consists in the execution of the LAPD protocol for the proper reception of frames and in the storage of the received message in a buffer. In the successive step A5 the CPU analyses the different level 2 fields of the received message, and acquires information on the basis of which the level 2 functions that regard the management of connection between BTS (BTSC) and BSC are performed in order to guarantee the regular circulation of the foreseen level 3 information flow (messages) between the BTS (BTSC) and the telephone processor TDPC, or directly between MS (UE) and TDPC. The above mentioned level 3 messages are mainly those of protocols called RR', RR* and BTSM (BTS Management) described in GSM 08.58 recommendations, in which: BTSM allows for the dialogue between BSC and BUS; RR' and RR* constitute the radio protocol RR that controls the functions of Power Control, Frequency Hopping, Configuration of channels on the radio frame, Ciphering, Handover; more in particular, RR' enables the dialogue between MS and BTS; RR* enables the dialogue between MS and BSC, crossing through BTS in a transparent way. On the basis of the issue of the above mentioned analysis, at the step A6 the message is transferred to the telephone processor TDPC, if it is destined to the same, otherwise in the step A7 it is transferred to the CPU for processing under its competence and queuing of message resulting from processing. The performance of steps A6 and A7 redirects the process to point A placed before the interrogation cycle A3. Whenever at the step A3 the interrupt flag is not ascertained, the CPU introduces step A8 where the queue of messages forwarder by the processor TDPC is analysed. If there is at least one message queuing in A8 the CPU performs the step A9 in which the message is selected and then performs step A10 for the forwarding of message to the competent LAPD link towards BTS or BTSC, afterwards the process returns to the point A. If from the queue analysis from TDPC made at step A8 it results that the queue is empty, the CPU performs the step A11 where it analyses the queue of messages generated by itself and selects a queuing message, or if the queue is empty, it refers to point A. Depending on the destination of the selected message, the steps A12 or A13 are carried out, at the end of each one of which the process goes back to point A. At step A12 the message is forwarded on the competent LAPD link towards BTS or BTSC; at step A13 the message is transferred to the telephone processor TDPC for its addressing towards the links SS7 coming out of M-BSC.

The description of FIG. 8 highlights the capacities of PPLD unit to forward messages; some examples will be more explanatory. The INTERCELL_HAND_CON_IND message coming from BTS/BTSC is queued by PPLD and transferred to TDPC at step A13 for generation of an inter-cell handover command, or of a request of an external handover to MSC. The HO_CANDIDATE_ENQUIRE_INVOKE message is queued by TDPC (coming from MSC) and transferred to BTS/BTSC in step A10. The MS_RF POWER_CAPABILITY message is queued by TDPC and transferred to BTS/BTSC at step A10. The HO_CANDIDATE_ENQUIRE_COMPLETE message is queued by PPLD and transferred to TDPC at the step A14. The CONDITION_FOR_INTER_CELL_HO message is queued by PPLD and transferred to TDPC at step A13.

With reference to FIG. 9 the process of exchange of signalling messages concerning the PPS7 block is described. The process starts from step B1 of START in which the CPU inside to this block initialises the telephone processor TDPC. In the successive step B2 the CPU activates the SS7 protocol and goes to step B3 where it enters an interrogation cycle of interrupt flag of message reception on the SS7 links. In the case of reception, in B4 a process of message reception and of storage in a buffer is carried out. In the next step B5, the CPU analyses the different level 2 fields of the received message in order to define its destination. On the basis of the analysis result, at the step B6 the message is transferred to the telephone processor TDPC, if it is addressed to the latter, otherwise in B7 it is transmitted on the competent SS7 link to be returned back to the network. The execution of steps B6 and B7 redirects the process to point B placed before the interrogation cycle B3. If at the step B3 the interrupt flag is not ascertained, the CPU introduces the step B8 where the queue of messages transferred by the processor TDPC is analysed. If the queue is empty the process returns to the point B, otherwise the CPU carries out the step B9 in which the message is selected and forwarded on the competent LAPD link, afterwards the process returns to point B.

With reference to FIG. 10 the process of signalling message exchange that regards the TDPC block is analysed. The process starts from step C1 of START in which the CPU internal to this block initialises the interfaces towards the PPLD and PPS7 blocks. In the successive step C2, the CPU analyses the queue of messages coming from the PPS7 block. In the case a queuing message is present, the message at the step C3 is selected and analysed. If at the step C3 the message results addressed to a LAPD link, at the successive step C4 the message is opportunely processed and at the step C5 the resulting message is converter as for protocol from SS7 to LAPD and transferred to the competent PPLD block; afterwards the process goes to point C placed immediately before step C2. If at step C3 the massage results directed again towards a SS7 link, the message at the step C6 is opportunely processed and the resulting message is directly transferred to the concerned PPS7 block; afterwards the process returns to the point C. If at the step C2 the queue of messages PPS7 is empty, the CPU introduces the step C7 where the queue of messages transferred by the PPLD block is analysed. If the queue is empty the process goes to point C, otherwise the CPU carries out the step C8 in which a message is selected and analysed. If at the step C8 the message results directed again towards a link LAPD, the message at the step C9 is opportunely processed and the resulting message directly transferred to the competent PPLD block; afterwards the process returns to the point C. If at the step C8 the selected message results directed towards a SS7 link, at the step C10 it is opportunely processed and the resulting message is converted, at step C11 as regards protocol from LAPD to SS7 and transferred to the competent PPS7 block afterwards the process goes to point C.

With reference to FIG. 11, it is finally described the process of signalling message exchange concerning the switching node MSC is described. It is assumed a case in which the MSC switch is connected to a number of n station controllers M-BSC by means of a same number of interface A connections. The process starts from step D1 of START in which the CPU inside this network node initializes the network interface towards PSTN. In the next step D2 the CPU activates the SS7 protocol on the links of the interface A with each controller block M-BSC1, M-BSC2, . . . , M-BSCn, and then goes to the step D3 where it enters an interrogation cycle of an interrupt flag of mess age reception on the SS7links. In the case of flag assertion, a process of message reception by one of the station controllers M-BSC is carried out in D4. In the successive step D5 the message is transferred to the network, afterwards the process goes to point D placed immediately before the interrogation cycle at step D3. If at step D3 the interrupt flag is not asserted, the CPU introduces the step D6 where the queues of the messages received from the network are analyses. If the cascade of queues is empty the process goes to the D, otherwise the CPU performs the sleep D7 in which the CPU analyses the different level 2 fields of the received message to define its destination. In the successive step D8 the message is forwarded on a SS7 link towards the concerned station controller M-BSC, afterwards the process goes to point D.

The description of the architecture of the new controller of base transceiver station M-BSC an be assumed complete as regards the modes of connection to the network either of the old BTS stations or of the new TD-SCDMA stations. The proposed architecture enables to address in the correct way the relevant signalling messages within and outside the M-BSC block. Finally, we shall analyse the innovations introduced to make the new TD-SCDMA technology transparent to the network, in this case to the MSC switch. The modifications concerning in particular the present invention foresee the utilization of means acting on the dynamics of the external handover, among the cells of the same or preferably of different technology. The internal and inter-cell handovers do not require special interventions. As already said in the introduction, a handover between cells of different technologies obviously presupposes that the mobile supports both, and that it carries out actions to make effective its own mobility between both the typologies of cells. These actions consist in the monitoring of the capacity of the so-called beacon channels (BCCH) of the camped/serving cell and of the adjacent cells of both the technologies, either in the idle mode, as already said in the introduction, or in the connected mode. Regardless of the access technology of the mobile, the monitoring of adjacent cells in the connected mode is part of a more extended activity of measurement performed by the mobile on the signals transmitted by BTS/BTSC in downlink, whose results are values regularly uplink transmitted towards BTS/BTSC, that in turn carries out measurements on the signals transmitted by the mobile in uplink and with the total measurements in both the directions prepares the MEASUREMENT_RESULT message. Processing of this message allows for generation of controls able to manage the mobility of users, and i.e. the controls for the procedures of Power Control, Time Advance, and of the different types of Handover. The content of the information field of the MEASUREMENT_RESULT message corresponding to the list of N adjacent cells candidate for the handover, differs, in the case of a dual-standard mobile connected to a TD-SCDMA cell, from the content of the same information field in the case of a single-standard mobile, and from that referred to a dual-standard mobile connected to a GSM cell, in the fact of inclusion of a mixed list comprising GSM cells and TD-SCDMA cells placed in the priority order. The mixed list is included in the INTERCELL_HANDOVER_CONDITION_INDICATION message sent from BTSC to the station controller M-BSC for further processing according to the present invention. The restrictions plat on the diversification of the information content mean that the BTS of the GSM remains unchanged and absolutely unaware of the new technology, while the BTSC accepts the signalling with MEASUREMENT_RESULT information of the precedent GSM technology. Innovations introduced by the controller M-BSC will appear clear from the description of the following figures.

Figure 12:
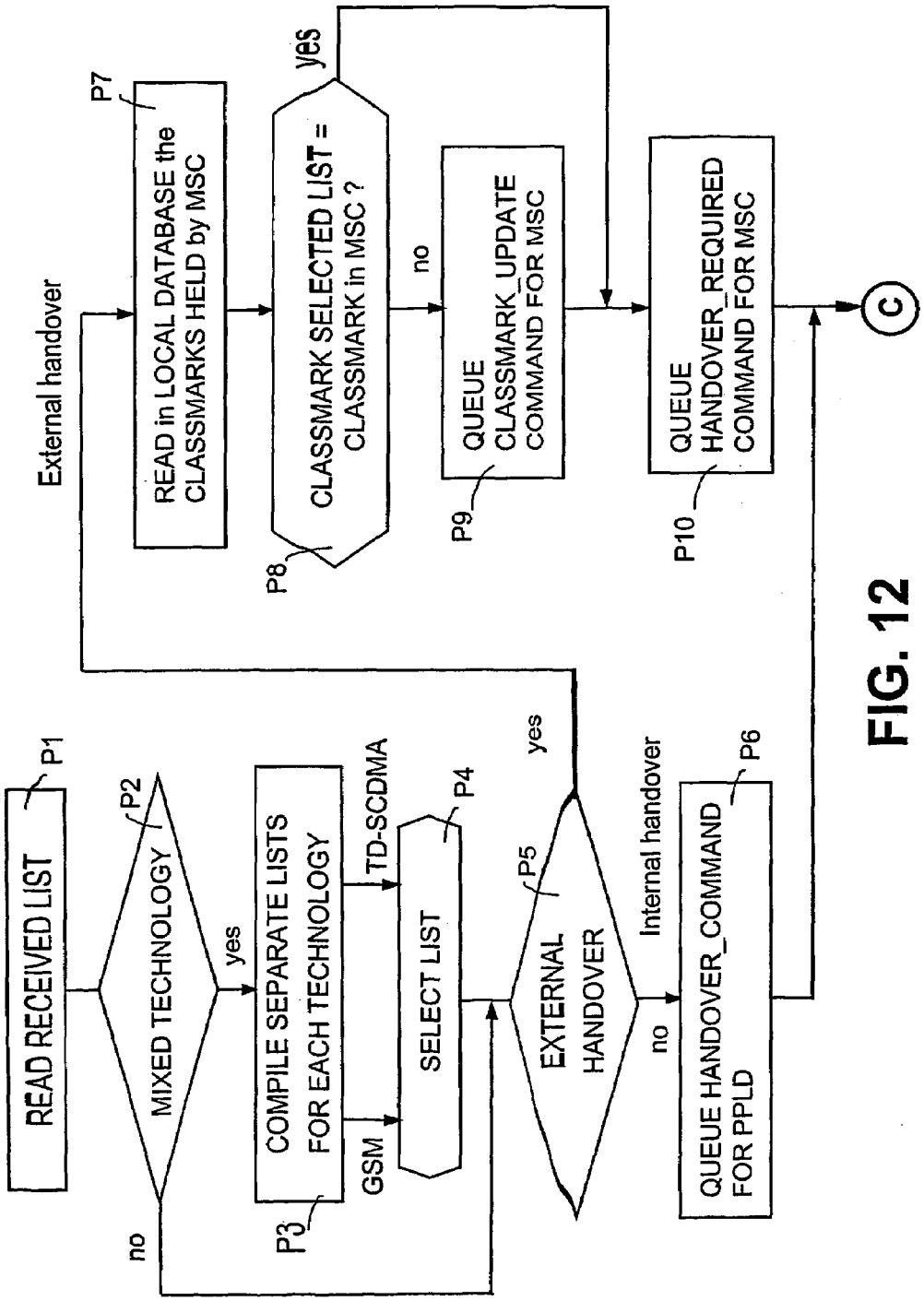
FIG. 12 shows a program performed by the TDPC processor of FIG. 7 in the implementation of the present invention.

FIG. 12 is a flow-chart of a program carried out by a generic TDPC processor of FIG. 7 to allow MSC to manage an external handover from 3G cells in a transparent mode to the GSM core network.

The program mainly concerns the processing carried out at the step C10 of the process of FIG. 10. This implies the reception and analysis of the INTERCELL_HANDOVER_CONDITION_INDICATION message performed at the steps C7 and C8, as well as the execution of the step C11 for the queuing of processed messages towards the concerned processor PPS7, for the transfer to MSC of the HANDOVER_REQUIRED and CLASSMARK_UPDATE messages. The processing performed at the step C10 concerns the cases of handover visible in FIG. 6 and in FIG. 7. At the initial step P1 the list of cells transferred with the first message is read in the memory to perform the test at the step P2 on the information field relative to the type of technology employed. The list is compiled by BTSC and includes in the decreasing priority order the cells monitored by the mobile on the basis of their capability to be selected as target for the handover execution. The analysis at the step. P2 can highlight the forwarding of a list of cells of one sole technology, or of two different technologies. In the second case step P3 is performed in which the cells of the mixed list are subdivided in two homogeneous lists of candidate cells, a list of TD-SCDMA cells and a list of GSM cells, respecting the priority order that cells had in the mixed list (the case can be generalized to lists for several technologies). In the following step P4 the processor selects the list to be sent to MSC by means of criteria to be shortly described. The selection made at step P4 actually determines also the choice of the transceiver access technology to be used in the target cell, whatever be the cell finally effectively selected from the authorized list.

In the successive step P5 a test is carried out to check if the handover to be performed is either internal or external. The criterion used is the following: if the first cell of the received list, i.e. that with the highest priority, belongs to the dominion of the serving BSS, then the handover is internal, if on the contrary it belongs to the dominion of an other BSS, then the handover is external and it shall involve MSC. In the first case (internal handover) the step P6 is carried out; in this step the HANDOVER_COMMAND message for the BTS, or BTSC, target including the preliminarily selected list of cells is placed in queue towards the competent processor PPLD. In the second case (external handover) a step P7 for the of reading a database residing in the MEM-T memory (FIG. 7) that locally maps to M-BSC the classmark information of the mobile actually having MSC, to check at the step P8 if the above mentioned information are congruous with those of the technology expressed by the selected list. If the reply in P8 is "no", the steps P9 and P10 are successively performed to transfer two messages in the queue towards MSC. At step P9 a message containing a CLASSMARK_UPDATE control including the classmark information of the mobile in the technology expressed by the selected homogeneous list is carried out. As clearly stated by the recommendation GSM 08.08, this message contains different information related to the capacity of the mobile in the specified radio access technology. In this way the information stored in MSC is aligned to the access characteristics of the system towards which a handover attempt is underway. It is assumed that the mobile classmarks associated with the selected list are already known to the M-BSC controller, the successive figures will show the modes of such an acquisition. At step P10 a HANDOVER_RE-QUIRED message containing the list of selected cells is queued. If at the step P8 the reply is "yes" only step 10 sooner mentioned is carried out.

As regards the selection of list performed at step P4 there are different criteria that may be used to comply with the qualification requirements of service requested by the mobile. The case of FIG. 6 shall not mislead since the figure assumes that the choice of the list has already been carried out and that it corresponds to the GSM one. Considering a more general case extended also to the scenario of FIG. 5, it appears that the M-BSC1 controller can effectively select between both the homogeneous lists. Notwithstanding all the cells of all the lists have in a bigger or smaller measure the above-mentioned qualification requirements, a first criterion is that to select the list whose first cell in the initial mixed list having highest absolute priority. In this case, if the highest priority in the mixed list corresponds to a TD-SCDMA cell, the homogeneous list of this technology is selected and the relative handover will be "intra-system", in the contrary instance, the GSM list will be selected and the relative handover will be "inter-system". A second criterion is that to always select a list associated with the TD-SCDMA technology, to the specific purpose of favouring since the beginning the higher service opportunities offered by the third generation new technology. This does not mean that if the MSC node does riot anyhow succeed in establishing a connection the M-BSC controller cannot successively send a list of GSM cells, after classmarks updating. If on the contrary sending first a GSM list the connection is actually established, then the mobile should definitely enter the GSM world without any return possibility to the new 3G technology during the whole duration of the connection to the new cell.

Upon reception of the CLASSMARK_UPDATE and HANDOVER_REQUIRED messages, or only of the HANDOVER_REQUIRED message, the network mode MSC operates in the usual inode to complete the external handover. More in particular: it selects the first cell of the received list as target cell for the handover and promotes an enquiry to check if there are appropriate resources in this cell. This implies the involvement of the second controller M-BSC2, since the target cell was external. If the searched resources do not exist in the target cell, the search continues with the second cell of the received list (that may return to be internal to the area of the serving BSS), and so on until it finds the suitable cell.

FIG. 13 shows a time sequence of level 3 messages (Message Sequence Chart) referred to a preferred embodiment of the invention applied to the hangover typology shown in FIG. 6. It is an external inter-system handover started by the multi-standard MOB1 mobile served by cell 1 TD-SCDMA and addressed to cell 2 GSM (DCS). The subject handover involves the serving controller M-BSC1, the circuit switch MSC, and the target controller M-BSC2. The description avails of the notions developed to describe FIG. 12 and therefore may be simplified. The steps of the time sequence are:

- the serving station BTSC sends an INTERCELL_HAND_COND_IND message that includes a mixed list of TD-SCDMA and GSM cells to the serving controller M-BSC1. Based on the list received, the serving controller M-BSC1 compiles two homogeneous lists of candidate cells, one list for TD-SCDMA cells and the other for GSM cells respecting the priority order that the cells had in the mixed list.
- The serving controller M-BSC1 selects the homogeneous list of GSM cells to be forwarded to MSC (the case subsequently proposed is a result of such a choice). The M-BSC1 controller detects that the hangover is external and it shall therefore involve MSC. In this phase of the connection the multi-system mobile has already sent to M-BSC1 the classmarks relative to the TD-SCDMA technology, so that from the analysis of the classmarks it perceives the multi-system capacity of the mobile (in addition to receiving a mixed list) and requests the mobile to send the classmarks relative to the GSM technology. The M-BSC1 controller checks in a local database, that records the classmark typolosy held by MSC for the considered mobile, that the classmarks held by MSC are congruent with the classmarks characterizing the GSM access technology of the selected list. In case of inconsistency, the M-BSC1 controller sends MSC a CLASSMARK_UPDATE message including the GSM classmarks just sent by the mobile. At this point the MSC controller overwrites the new GSM classmarks on the previous TD-SCDMA. In this way, the information stored in MSC is aligned to the access characteristics of the system towards which a handover attempt is underway.
- The serving controller M-BSC1 sends the handover request to MSC through a HANDOVER_REQUIRED message including the list of target cells previously selected. The subject message entrusts MSC with the charge to select the cell to which the mobile should be transferred, binding it to comply with the selected access technology, in this case the GSM (DCS) one.

At this point MSC starts to search for a cell (between those of the received list) appropriate to satisfy the handover retest. Once the target cell has been identified, MSC will send a HANDOVER_REQUEST message to the target controller M-BSC2, on interface A, containing the classmarks previously updated.

The target controller M-BSC2 sends the CHANNEIL_ACTIVATION message to the target BTS of the GSM type to control the enabling of the transmitter, expecting in return a CHANNEL_ACTIVATION_ACK acknowledgment message.

Upon reception of the acknowledgment message, the controller M-BSC2, sends the HANDOVER_REQUEST_ACK message to MSC to notify that search and activation of resources on the target cell have been successfully performed. The message conveys the command to be sent to the mobile to transfer it to the target cell.

The switch MSC forwards to the serving controller M-BSC1 a HANDOVER_COMMAND message that includes the control of handover towards the target cell.

The serving controller M-BSC1 sends the INTERSYSTEM_HANDOVER_COMMAND message to the serving BTSC to control the transfer of the mobile on the target BTS of GSM type.

FIG. 14 shows a sequence of messages featuring an alternative to the handover procedure of the previous FIG. 13. The alternative is carried out by the controller M-BSC1 during the establishment phase of a TD-SCDMA call to provide for the immediate request of classmark information related to the capacity of the mobile in both the systems TD-SCDMA and GSM (DCS). The introduced improvement enables to acquire during a non critical phase in terms of delays and latencies that information that could reveal itself indispensable for a successive handover. The variant involves only the serving BSS system and may be reiterated any time the network considers it necessary. The time sequence of the steps of this variant is as follows:

After the mobile has accessed the network it forwards spontaneously, or upon request, the classmarks relative to the system to which it is connected through a CLASSMARK_CHANGE message. This message reaches the serving BTSC station and from here the controller M-BSC1.

The M-BSC1 controller forwards the classmark information, relevant to the TD-SCDMA system, received from the mobile to the MSC switch through the CLASSMARK_UPDATE message on interface A.

The controller M-BSC1 collects the information relative to the capacity class of the mobile from the received classmark information with the CLASSMARK_CHANGE message and feeds it to the serving BTSC with the MS_RF_POWER_CAPABILITY return message.

The M-BSC1 controller sends the serving BTSC a CLASSMARK_ENQUIRY message to request the classmark information relative to the GSM system, to the purpose of handover speed up. The serving BTSC transfers the above-mentioned message to the mobile MOB1.

The mobile MOB1 replies with the CLASSMARK_CHANGE message that contains the capacity of the mobile in the GSM system. The message is addressed towards the serving BTSC, and from here to the M-BSC1 controller. Upon arrival of the CLASSMARK_CHANGE message, the controller M-BSC1 memorizes also these new classmarks that, in case of need, it shall be able to immediately send to MSC without losing further time in submitting the request and waiting for the reply.

For completeness sake, with reference to FIG. 15 a case of failure of an inter-system handover with classmark updating is shows. The reasons for the handover failure appear in the target BSS, so that the sequence of forward messages is still the one of FIG. 13, possibly enriched with the steps of the variant of FIG. 14. The handover failure is caused by the fact that in the target BSS system, in this case comprising GSM cells, no suitable/free resources exists for whatever reason to satisfy the service. From this point on, the sequence of messages of FIG. 15 differs from that of FIG. 13 in the following way:

If the target BTS station is not able to satisfy the handover request it sends a negative CHANNEL_ACTIVATION_NACK message to its own M-BSC controller to notify it about the situation.

At this point the target controller M-BSC notifies the switch MSC of the failure of the handover procedure by the target BSS system, seeding it a HANDOVER_FAILURE message.

Upon reception of the HANDOVER_FAILURE message, the MSC switch checks if there is any possibility to search for resources on other cells among those provided to it by the serving controller M-BSC. In the case this is not possible, the HANDOVER_REQUIRED_REJECT message is generated towards the controller M-BSC of the serving BSS system; this implies the failure of the external and inter-system handover procedure.

Failure of the handover procedure towards GSM cells implies also that the serving controller M-BSC must take care to change the GSM classmarks previously stored by MSC by TD-SCDMA ones, in such a way that all the network components have a congruent information. This occurs sending the CLASSMARK_UPDATE message to the MSC switch.

APPENDIX 1

TABLE 1

Capacity classes of the GSM mobile

| Capacity class | GSM 900 Maximum Rated Output Capacity | DCS 1 800 Maximum Rated Output Capacity | Tolerance (dB) under | |
|---|---|---|---|---|
| | | | normal conditions | extreme conditions |
| 1 | — | 1 W (30 dBm) | ±2 | ±2.5 |
| 2 | 8 W (39 dBm) | 0.25 W (24 dBm) | ±2 | ±2.5 |
| 3 | 5 W (37 dBm) | 4 W (36 dBm) | ±2 | ±2.5 |
| 4 | 2 W (33 dBm) | | ±2 | ±2.5 |
| 5 | 0.8 W (29 dBm) | | ±2 | ±2.5 |

NOTE:
The minimum rated output capacity of the mobile for all the classes of the GSM 900 MS is 5 dBm, and 0 dBm for all the classes of the DCS 1 800 MS.

TABLE 2

Capacity classes of the TD-SCDMA mobile

| Capacity class | Maximum Rated Output Capacity | Tolerance (dB) |
|---|---|---|
| 1 | 2 W (33 dBm) | +1/−3 |
| 2 | 1 W (30 dBm) | +1/−3 |
| 3 | 0.5 W (27 dBm) | +1/−3 |
| 4 | 0.24 W (24 dBm) | +1/−3 |
| 5 | 0.12 W (21 dBm) | +1/−3 |
| 6 | 0.01 W (10 dBm) | +1/−3 |

The invention claimed is:

1. A controller for base transceiver stations of a cellular telecommunication using transceiver access technologies different between them to communicate with at least a mobile equipment that requires an inter-cell handover through a switching circuit that knows only a first transceiver access technology, comprising:

first interface means provided with connections each of two transmission directions for the transfer of traffic and signaling between said base transceiver stations and said controller;

second interface means provided with connections in each of two transmission directions for the transfer of traffic and signaling between said switching circuit and said controller; and processing means connected to said first and second interface means to process the signaling aimed at handover, wherein said processing means include:

means for obtaining as many homogeneous lists of cell candidates for handover as there are of the different transceiver technologies associated with the cells of a mixed list sent by the base transceiver station serving said mobile equipment that utilizes a second different transceiver access technology;

means for the selection of a homogeneous list of cell candidates on the basis of qualification criteria for the service required by the mobile;

storage means for storing classmarks held by the switching circuit and that indicate the operation capacities of the mobile station with respect to a utilized transceiver access technology;

means for comparison between the stored classmarks and the classmarks inherent to the transceiver access technology of cells of the selected homogeneous list of cell candidates; and means for the compilation of messages, to be transmitted to the switching circuit, containing updated classmarks to overwrite on previously stored classmarks and a handover request with the selected homogeneous list of cell candidates, respectively.

2. The controller according to claim 1, wherein said means for the selection of a homogeneous list, of cell candidates select the homogeneous list of cell candidates that include the cells of said second transceiver access technology.

3. The controller according to claim 1, wherein said means for the selection of a homogeneous list, of cell candidates select the homogenous list of cell candidates that include the cell with the highest priority in said mixed list.

4. A handover method between cells served by base transceiver stations employing radio access technology different between them, through a network that knows only a first radio access technology to communicate with a mobile station that requires the handover, and which accesses the network through a second different radio access technology and transmits classmarks that indicate the operation capacities of the mobile station with respect to the used technology;

the method including the following steps carried out by a controller of said base transceiver stations connected to the network:

a) receiving from a serving station a mixed list of candidate cells for the handover comprising cells of at least two radio access technologies, the first radio access technology being one of the at least two radio access technologies;

b) compiling as many homogeneous lists of handover candidate cells as there are of the radio access technologies of the cells in the mixed list of candidate cells, each homogeneous list of handover candidate cells including cells of only one radio access technology;

c) selecting a homogeneous list of handover candidate cells on the basis of qualification criteria for the service required by the mobile station;

d) comparing classmarks corresponding to the radio access technology of the cells of the selected homogeneous list of handover candidate cells with classmarks held by the network and, where conflicting, transferring to the network the classmarks associated with the selected homogeneous list of handover candidate cells to replace the classmarks held by the network; and e) sending a message of a handover request to the network, including the selected homogeneous list of handover candidate cells for the final selection of a target cell.

5. The handover method according to claim 4, wherein the homogeneous list of handover candidate cells that includes the cells of said second radio access technology is selected at the step c).

6. The handover method according to claim 4, wherein the homogeneous list of handover candidate cells that includes the cell having a highest priority in said mixed list is selected at the step c).

7. The handover method according to claim 4, wherein the classmarks held by the network are locally mapped at said controller of said base transceiver stations.

8. The handover method according to claim 4, wherein the method includes the following steps carried out during the initial phase of a call:

analyzing classmarks transmitted by the mobile station and determining the capacity of the mobile station to support other radio access technologies; and requesting the mobile station to transmit the classmarks relevant to the other radio access technologies and store them locally inside said controller of said base transceiver stations for their use, in case of need, to make the handover faster.

9. The handover method according to claim 4, wherein, in the case of handover failure, the classmarks currently held by the network are replaced with the classmarks that were immediately preceding said memorization the classmarks currently held by the network, to make the information held by the network consistent with the information locally stored at said controller of said base transceiver stations.

10. The handover method according to claim 4, wherein said first radio access technology corresponds to the Global System for Mobile communications or Digital Cellular System standard and said second radio access technology corresponds to the Time Division-Synchronous Code Division Multiple Access standard.

* * * * *